US012676660B2

(12) United States Patent
Yapici et al.

(10) Patent No.: US 12,676,660 B2
(45) Date of Patent: Jul. 7, 2026

(54) USER EQUIPMENT DENSITY-BASED CODEBOOK ADJUSTMENT FOR RECONFIGURABLE INTELLIGENT SURFACE-ASSISTED COMMUNICATIONS

(71) Applicant: QUALCOMM Incorporated, San Diego, CA (US)

(72) Inventors: Yavuz Yapici, Florham Park, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 18/348,208

(22) Filed: Jul. 6, 2023

(65) Prior Publication Data

US 2025/0015869 A1 Jan. 9, 2025

(51) Int. Cl.
H04B 7/06 (2006.01)

(52) U.S. Cl.
CPC ................................. H04B 7/06968 (2023.05)

(58) Field of Classification Search
CPC ......... H04B 7/0426; H01Q 15/14; H01Q 3/46
See application file for complete search history.

(56) References Cited

U.S. PATENT DOCUMENTS

2022/0278733 A1 9/2022 Jassal et al.
2023/0007522 A1* 1/2023 Yang ................... H04W 56/001

OTHER PUBLICATIONS

International Search Report and Written Opinion—PCT/US2024/032782—ISA/EPO—Oct. 10, 2024.
Zang H., et al., "Intelligent Omni-Surfaces: Simultaneous Refraction and Reflection for Full-Dimensional Wireless Communications", IEEE Communications Surveys & Tutorials, vol. 24, No. 4, Aug. 29, 2022, pp. 1997-2028, XP011928239, p. 2009, left col, 1st para, p. 2003, right col, 2nd para, p. 2011 left col equation 12, p. 2008, last line, (p. 207, left col 3rd bullet point, p. 2007, sec IV, 1st para, p. 2014, right col, sec D, 2nd para, p. 2010, right col, 3rd full para, p. 2010, right col, 3rd full para, p. 2010 in equation 10, p. 2010 left col, last para, p. 2010 left col sec B title and 2nd para, p. 2010 sec B, 2nd para, p. 2010 right col. lower half, fig 26, 27, tab 4.

* cited by examiner

*Primary Examiner* — Elton Williams
(74) *Attorney, Agent, or Firm* — Holland & Hart LLP

(57) ABSTRACT

Methods, systems, and devices that support user equipment (UE) density-based codebook adjustment for reconfigurable intelligent surface (RIS)-assisted communications are described. A network entity may configure RIS codebooks based on dynamically changing UE densities, such that codebooks may be tailored for geographical regions with higher UE densities. The network entity may determine a geographical region to be served using a RIS associated with a higher UE density as compared to one or more UE densities associated with one or more other geographical regions. The network entity may indicate a codebook to a controller associated with the RIS that is associated with a set of parameters that may be based on the geographical region.

30 Claims, 11 Drawing Sheets

Receive a first indication of a first geographical region associated with a first UE density that is greater than a second UE density associated with a second geographical region — 805

Transmit, to a controller associated with a RIS, a second indication of a codebook for communication using the RIS, the codebook associated with a set of parameters that is based at least in part on the first indication of the first geographical region — 810

Perform, using the RIS in accordance with the codebook, a beam sweeping operation in the first geographical region — 815

800

210

105-a

Blockage 205-c 205-a    205-b 115-a 115-b

225

220

240

270-a 270-b 270-c

RIS Controller

285

235

215-a          215-b

245 — ▨ Codebook Indication

250 — ⊞ Message

255 — ⬚ Codebook Indication

260 — ▨ Message

200

130

105

115

Network
Entity

Transceiver

710

Antenna

715

Communications
Manager

720

Memory

Code

730

725

740

Processor

735

705

700

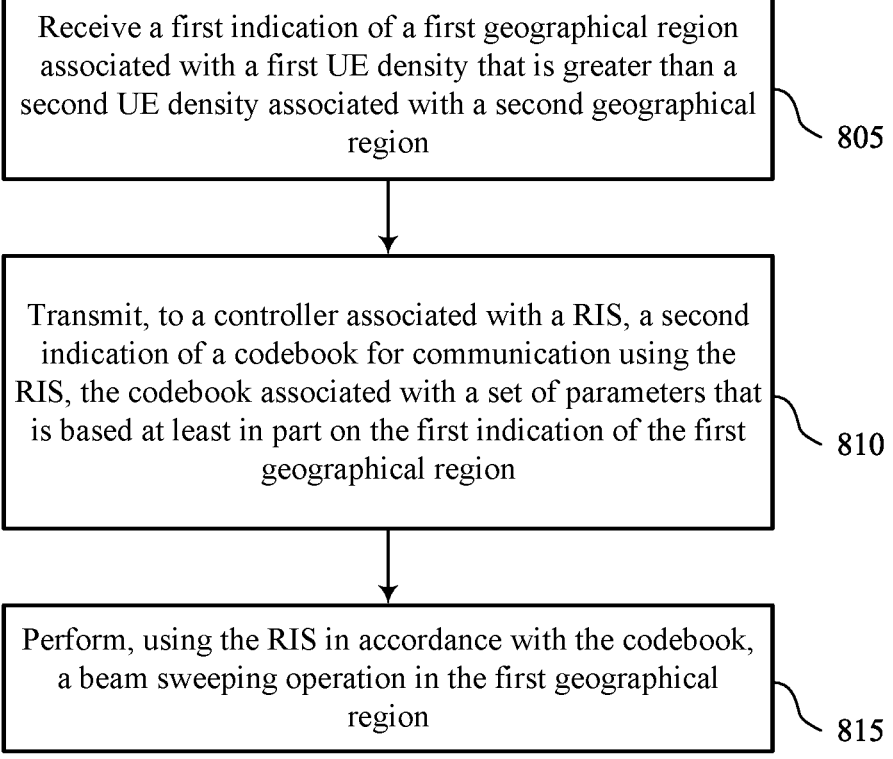

Receive a first indication of a first geographical region associated with a first UE density that is greater than a second UE density associated with a second geographical region

805

Transmit, to a controller associated with a RIS, a second indication of a codebook for communication using the RIS, the codebook associated with a set of parameters that is based at least in part on the first indication of the first geographical region

810

Perform, using the RIS in accordance with the codebook, a beam sweeping operation in the first geographical region

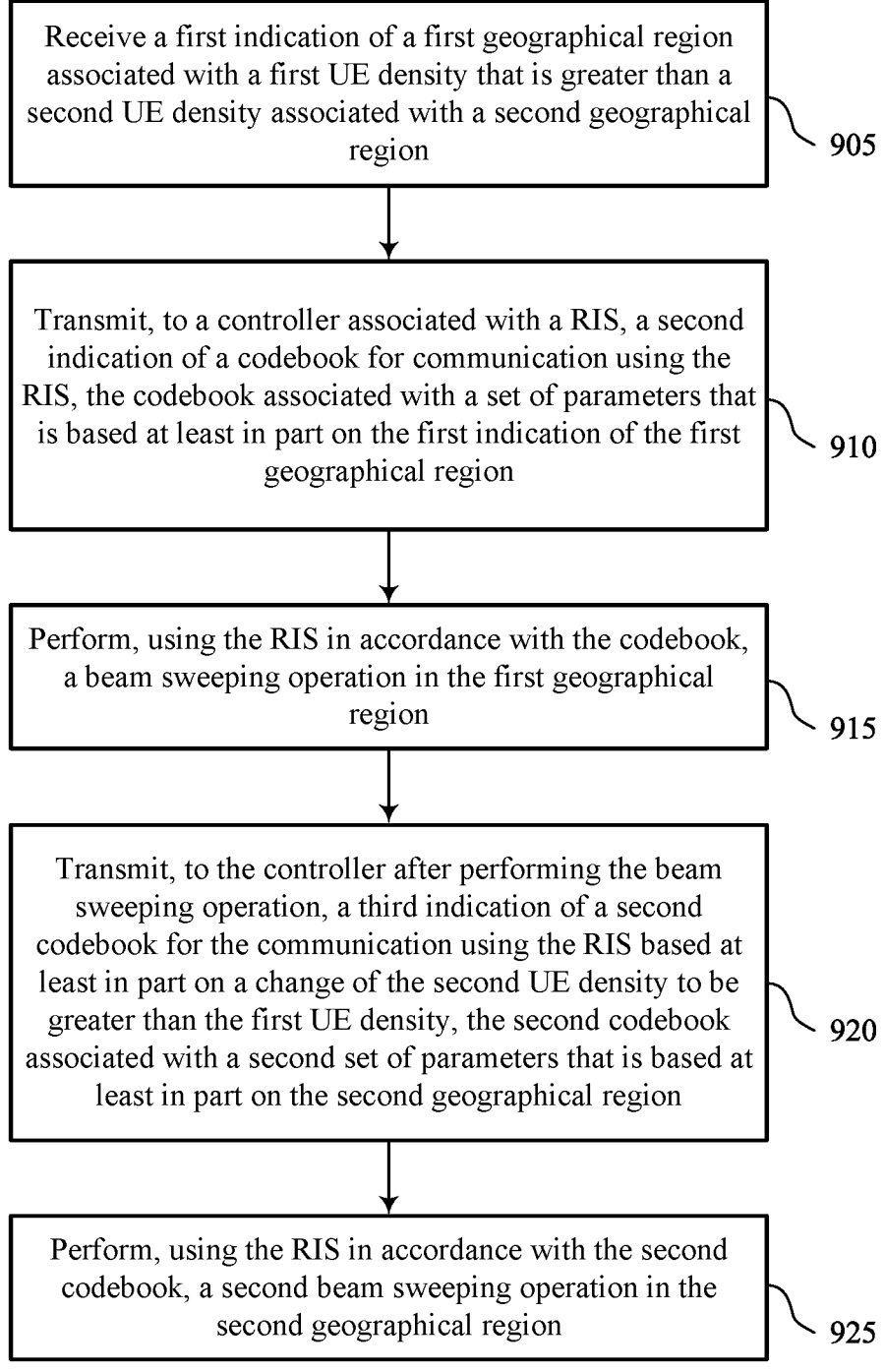

Receive a first indication of a first geographical region associated with a first UE density that is greater than a second UE density associated with a second geographical region

905

Transmit, to a controller associated with a RIS, a second indication of a codebook for communication using the RIS, the codebook associated with a set of parameters that is based at least in part on the first indication of the first geographical region

910

Perform, using the RIS in accordance with the codebook, a beam sweeping operation in the first geographical region

915

Transmit, to the controller after performing the beam sweeping operation, a third indication of a second codebook for the communication using the RIS based at least in part on a change of the second UE density to be greater than the first UE density, the second codebook associated with a second set of parameters that is based at least in part on the second geographical region

920

Perform, using the RIS in accordance with the second codebook, a second beam sweeping operation in the second geographical region

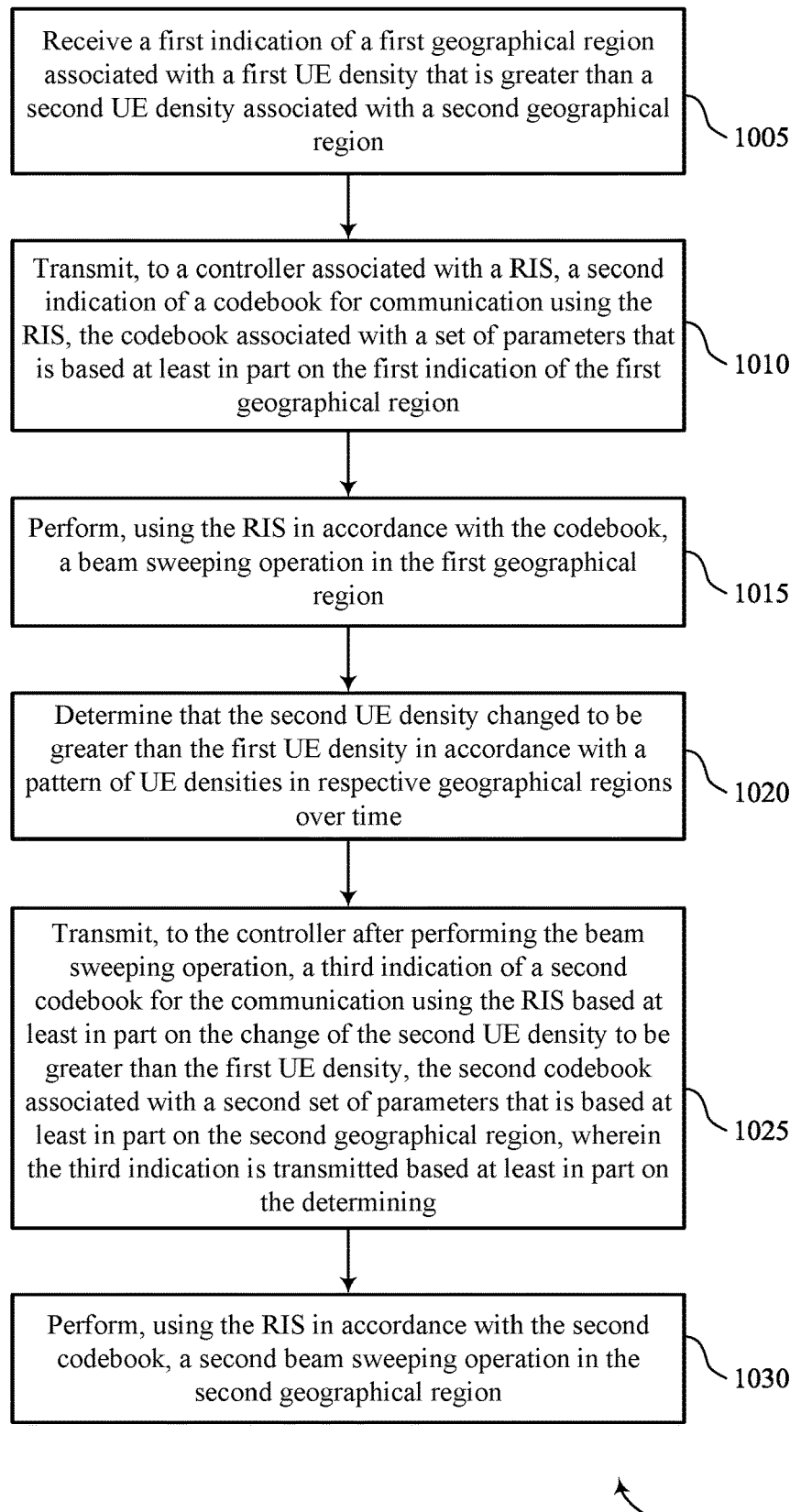

Receive a first indication of a first geographical region associated with a first UE density that is greater than a second UE density associated with a second geographical region

1005

Transmit, to a controller associated with a RIS, a second indication of a codebook for communication using the RIS, the codebook associated with a set of parameters that is based at least in part on the first indication of the first geographical region

1010

Perform, using the RIS in accordance with the codebook, a beam sweeping operation in the first geographical region

1015

Determine that the second UE density changed to be greater than the first UE density in accordance with a pattern of UE densities in respective geographical regions over time

1020

Transmit, to the controller after performing the beam sweeping operation, a third indication of a second codebook for the communication using the RIS based at least in part on the change of the second UE density to be greater than the first UE density, the second codebook associated with a second set of parameters that is based at least in part on the second geographical region, wherein the third indication is transmitted based at least in part on the determining

1025

Perform, using the RIS in accordance with the second codebook, a second beam sweeping operation in the second geographical region

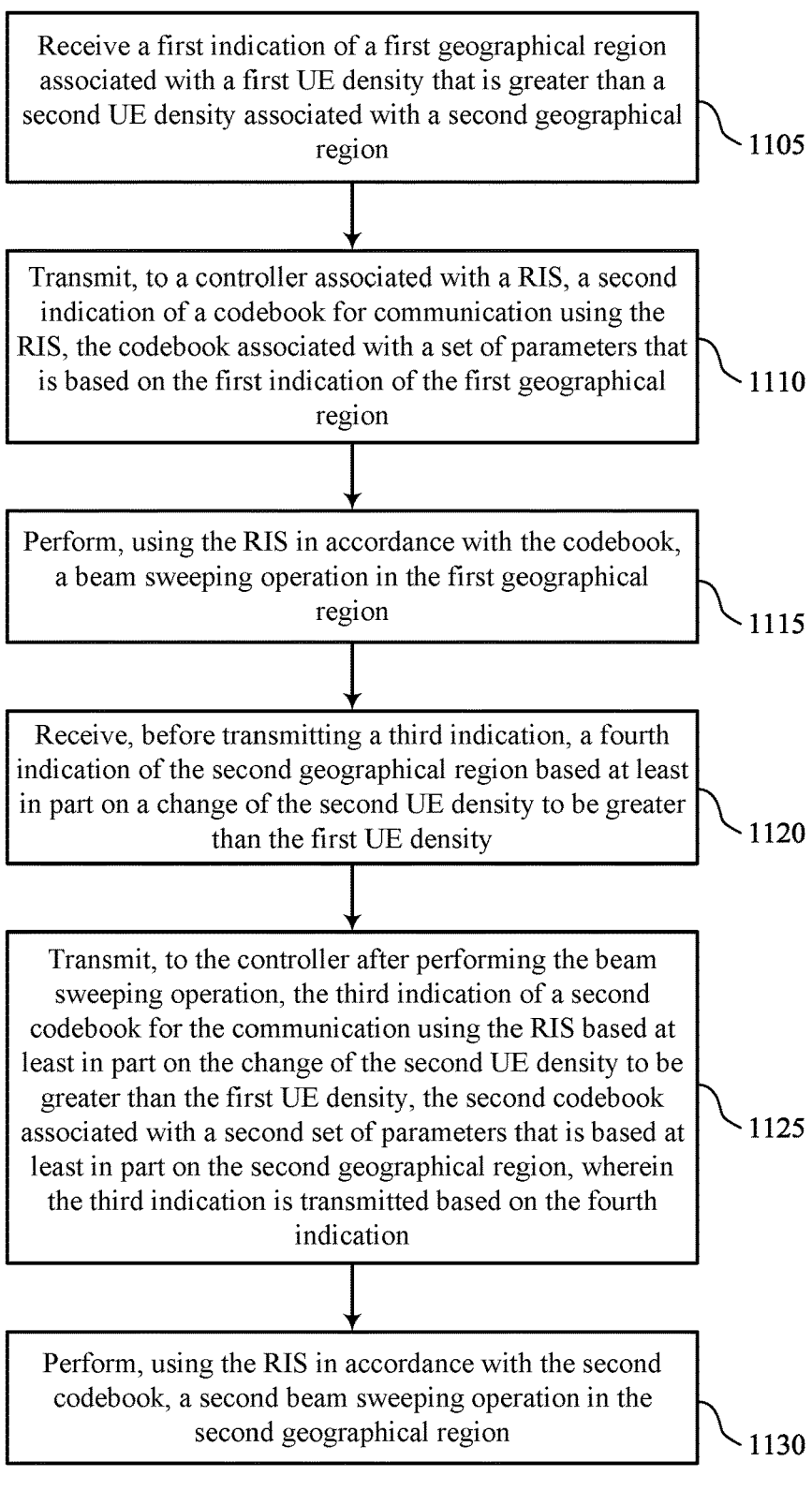

Receive a first indication of a first geographical region associated with a first UE density that is greater than a second UE density associated with a second geographical region

⟍ 1105

Transmit, to a controller associated with a RIS, a second indication of a codebook for communication using the RIS, the codebook associated with a set of parameters that is based on the first indication of the first geographical region

⟍ 1110

Perform, using the RIS in accordance with the codebook, a beam sweeping operation in the first geographical region

⟍ 1115

Receive, before transmitting a third indication, a fourth indication of the second geographical region based at least in part on a change of the second UE density to be greater than the first UE density

⟍ 1120

Transmit, to the controller after performing the beam sweeping operation, the third indication of a second codebook for the communication using the RIS based at least in part on the change of the second UE density to be greater than the first UE density, the second codebook associated with a second set of parameters that is based at least in part on the second geographical region, wherein the third indication is transmitted based on the fourth indication

⟍ 1125

Perform, using the RIS in accordance with the second codebook, a second beam sweeping operation in the second geographical region

USER EQUIPMENT DENSITY-BASED CODEBOOK ADJUSTMENT FOR RECONFIGURABLE INTELLIGENT SURFACE-ASSISTED COMMUNICATIONS

FIELD OF TECHNOLOGY

The following relates to wireless communication, including user equipment (UE) density-based codebook adjustment for reconfigurable intelligent surface (RIS)-assisted communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A network entity in a wireless multi-access communications systems may communicate information with a UE using a reconfigurable intelligent surface (RIS). A RIS may include reflecting or refracting elements operable to redirect incident signals from the network entity toward the UE, and vice versa.

SUMMARY

The described techniques relate to improved methods, systems, devices, and apparatuses that support user equipment (UE) density-based codebook adjustment for reconfigurable intelligent surface (RIS)-assisted communications. For example, the described techniques provide for configuring RIS codebooks based on dynamically changing UE densities such that codebooks may be tailored (e.g., sized, associated with a field of view (FOV), associated with one or more focal distances associated with beamfocusing) for coverage areas with higher UE densities. For example, a network entity may determine (e.g., receive an indication of) a geographical region to be served using a RIS associated with a relatively higher UE density (e.g., when compared to one or more UE densities associated with one or more other geographical regions), which may be referred to as a region of interest. The network entity may indicate a codebook to a controller associated with the RIS that is associated with a set of parameters that may be based on the geographical region. In some cases, a network (e.g., that indicates the geographical region to the network entity), the network entity, or both may dynamically determine the geographical region based on a priori known or learned patterns of changing UE density over time and use codebooks that are tailored for the geographical region in accordance with the pattern.

A method for wireless communications by a network entity is described. The method may include receiving a first indication of a first geographical region associated with a first UE density that is greater than a second UE density associated with a second geographical region, transmitting, to a controller associated with a RIS, a second indication of a codebook for communication using the RIS, the codebook associated with a set of parameters that is based on the first indication of the first geographical region, and performing, using the RIS in accordance with the codebook, a beam sweeping operation in the first geographical region.

A network entity for wireless communications is described. The network entity may include one or more memories storing processor executable code, and one or more processors coupled with the one or more memories. The one or more processors may individually or collectively operable to execute the code to cause the network entity to receive a first indication of a first geographical region associated with a first UE density that is greater than a second UE density associated with a second geographical region, transmit, to a controller associated with a RIS, a second indication of a codebook for communication using the RIS, the codebook associated with a set of parameters that is based on the first indication of the first geographical region, and perform, using the RIS in accordance with the codebook, a beam sweeping operation in the first geographical region.

Another network entity for wireless communications is described. The network entity may include means for receiving a first indication of a first geographical region associated with a first UE density that is greater than a second UE density associated with a second geographical region, means for transmitting, to a controller associated with a RIS, a second indication of a codebook for communication using the RIS, the codebook associated with a set of parameters that is based on the first indication of the first geographical region, and means for performing, using the RIS in accordance with the codebook, a beam sweeping operation in the first geographical region.

A non-transitory computer-readable medium storing code for wireless communications is described. The code may include instructions executable by one or more processors to receive a first indication of a first geographical region associated with a first UE density that is greater than a second UE density associated with a second geographical region, transmit, to a controller associated with a RIS, a second indication of a codebook for communication using the RIS, the codebook associated with a set of parameters that is based on the first indication of the first geographical region, and perform, using the RIS in accordance with the codebook, a beam sweeping operation in the first geographical region.

Some examples of the method, network entities, and non-transitory computer-readable medium described herein may further include operations, features, means, or instructions for transmitting, to the controller after performing the beam sweeping operation, a third indication of a second codebook for the communication using the RIS based on a change of the second UE density to be greater than the first UE density, the second codebook associated with a second set of parameters that may be based on the second geographical region and performing, using the RIS in accordance with the second codebook, a second beam sweeping operation in the second geographical region.

3

Some examples of the method, network entities, and non-transitory computer-readable medium described herein may further include operations, features, means, or instructions for determining that the second UE density changed to be greater than the first UE density in accordance with a pattern of UE densities in respective geographical regions over time, where the third indication may be transmitted based on the determining.

Some examples of the method, network entities, and non-transitory computer-readable medium described herein may further include operations, features, means, or instructions for receiving, before transmitting the third indication, a fourth indication of the second geographical region based on the change of the second UE density to be greater than the first UE density, where the third indication may be transmitted based on the fourth indication.

In some examples of the method, network entities, and non-transitory computer-readable medium described herein, the change of the second UE density satisfies a threshold change from a pattern of UE densities in the second geographical region over time and the fourth indication may be received based on the change of the second UE density satisfying the threshold change.

In some examples of the method, network entities, and non-transitory computer-readable medium described herein, the set of parameters includes a first quantity of codewords included in the codebook and the second set of parameters includes a second quantity of codewords included in the second codebook and the second quantity of codewords may be different than the first quantity of codewords based on the first geographical region being a first distance from the RIS that may be different than a second distance of the second geographical region from the RIS.

In some examples of the method, network entities, and non-transitory computer-readable medium described herein, the set of parameters includes at least one of a first FOV associated with the first geographical region, one or more first focal distances associated with the first geographical region, and a first quantity of codewords included in the codebook and the second set of parameters includes at least one of a second FOV associated with the second geographical region, one or more second focal distances associated with the second geographical region, and a second quantity of codewords included in the second codebook.

In some examples of the method, network entities, and non-transitory computer-readable medium described herein, the first quantity of codewords may be different than the second quantity of codewords based on the first FOV being different than the second FOV.

In some examples of the method, network entities, and non-transitory computer-readable medium described herein, the first FOV may be the same as the second FOV and the one or more first focal distances may be different than the one or more second focal distances.

In some examples of the method, network entities, and non-transitory computer-readable medium described herein, the set of parameters includes at least one of a FOV associated with the first geographical region, one or more focal distances from the RIS, and a quantity of codewords included in the codebook.

In some examples of the method, network entities, and non-transitory computer-readable medium described herein, receiving the first indication may include operations, features, means, or instructions for receiving, via one or more secure control messages, first positioning information associated with UEs located in the first geographical region over one or more durations and second positioning information associated with UEs located in the second geographical region over the one or more durations, where the first UE density may be determined to be greater than the second UE density based on the first positioning information and the second positioning information.

In some examples of the method, network entities, and non-transitory computer-readable medium described herein, the first indication indicates that the network entity may determine the set of parameters associated with the codebook to prioritize communications within the first geographical region over the second geographical region or a combination of the first geographical region and the second geographical region.

Some examples of the method, network entities, and non-transitory computer-readable medium described herein may further include operations, features, means, or instructions for transmitting, to the controller after performing the beam sweeping operation, a third indication of a second codebook for the communication using the RIS based on a change of the first UE density, a change of the second UE density, or both, the second codebook associated with a second set of parameters that may be based on a third geographical region including the first geographical region and the second geographical region and performing, using the RIS in accordance with the second codebook, a second beam sweeping operation in the third geographical region.

In some examples of the method, network entities, and non-transitory computer-readable medium described herein, the set of parameters includes a first quantity of codewords included in the codebook and the second set of parameters includes a second quantity of codewords included in the second codebook and the second quantity of codewords may be greater than the first quantity of codewords based on the third geographical region being larger than the first geographical region.

BRIEF DESCRIPTION OF THE DRAWINGS

FIGS. 8 through 11 show flowcharts illustrating methods that support UE density-based codebook adjustment for RIS-assisted communications in accordance with one or more aspects of the present disclosure.

DETAILED DESCRIPTION

Figure 1:
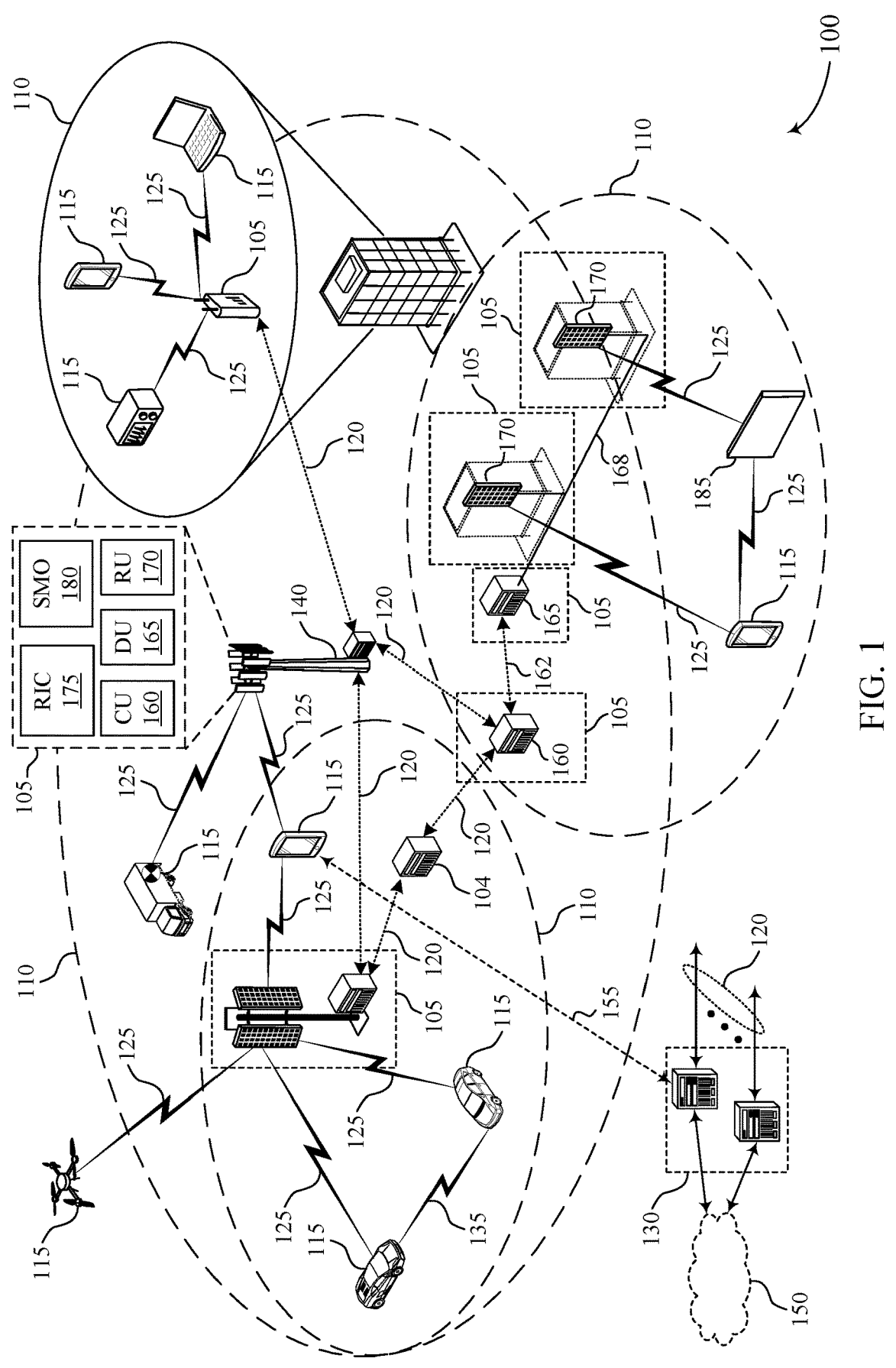
FIG. 1 shows an example of a wireless communications system that supports user equipment (UE) density-based codebook adjustment for reconfigurable intelligent surface (RIS)-assisted communications in accordance with one or more aspects of the present disclosure.

In some wireless communications systems, a network entity may support reconfigurable intelligent surface (RIS)-assisted communications. A RIS may be tuned to reflect and/or refract incoming signals at various angles, which may increase coverage and spectral efficiency, such as by enabling the network entity to support non-line of sight (LOS) communications (e.g., communicate around blockages). The network entity may use codebooks to communicate using the RIS, where a codebook may contain codewords (e.g., configurations) corresponding to beams at the RIS. In some examples, codebooks may include codewords that implement beamfocusing, in which a beam is shaped based on both a direction of the beam and a distance of a receiving device on which the beam is to be focused.

In selecting codebooks, in some cases, the network entity may assume static geometries for a cascaded network entity-to-RIS-to-UE channel used to support a coverage area of the RIS. In such static geometries, a tradeoff may be had between selecting a relatively larger codebook (e.g., containing a relatively larger quantity of codewords, covering a large field of view (FOV)) and selecting a relatively smaller codebook (e.g., containing a relatively smaller quantity of codewords). For example, larger codebooks may be associated with higher beam overhead (e.g., due to a high quantity of individual beams in the codebook), such as higher signaling overhead and beam sweeping latency associated with indicating a larger codebook, but higher coverage (e.g., higher receive power at a UE). Smaller codebooks may be associated with reduced beam overhead, but may result in reduced coverage in some portions of the coverage area as compared to a larger codebook, as a smaller codebook may contain less codewords (e.g., beams) to cover a same FOV as the larger codebook.

Various aspects relate generally to wireless communications using a RIS (e.g., RIS-assisted communication). Some aspects more specifically relate to UE density-based codebook adjustment for RIS-assisted communications. In some examples, a codebook used for RIS-assisted communication may be configured (e.g., selected, generated) based on dynamically changing UE densities. For example, the codebook may be configured to be tailored for coverage areas with relatively higher UE densities. As a result, codebooks may be tailored to focus on communications in relatively smaller geographical regions (e.g., as compared to a possible geographical region coverable by a RIS). For example, a network entity may determine (e.g., receive, from a network, an indication of) a geographical region associated with a higher UE density as compared to one or more UE densities associated with one or more other geographical regions. The geographical region may be referred to as a region of interest for which the network entity is to prioritize communications using a RIS. For instance, the network entity may indicate a codebook to a controller associated with the RIS that is associated with a set of parameters based on the region of interest. For example, the network entity may select the codebook based on an associated FOV (e.g., a FOV that covers the region of interest), an associated cardinality (e.g., a quantity of codewords in the codebook), one or more focal distances (e.g., associated with beamfocusing) of codewords included in the codebook, or a combination thereof, among other possible parameters associated with the codebook. In some cases, the network, the network entity, or both may dynamically determine the geographical region based on a priori known or learned patterns of changing UE density over time, and the network entity may use codebooks that are tailored for the geographical region in accordance with the pattern.

Particular aspects of the subject matter described in this disclosure can be implemented to realize one or more of the following potential advantages. In some cases, codebooks may be tailored to focus on communications in smaller geographical regions, which may enable smaller codebooks to provide improved coverage (e.g., increased received power within the geographical regions). Accordingly, the network entity and a controller associated with the RIS may experience reduced beam overhead (e.g., reduced signaling overhead, reduced beam sweeping latency) and higher spectrum efficiency, as communicating the smaller codebook may use less wireless communication resources, while providing higher received power to one or more UEs within the indicated geographical region.

Aspects of the disclosure are initially described in the context of wireless communications systems. Aspects of the disclosure are also described in the contexts of a process flow. Aspects of the disclosure are further illustrated by and described with reference to apparatus diagrams, system diagrams, and flowcharts that relate to UE density-based codebook adjustment for RIS-assisted communications.

FIG. 1 shows an example of a wireless communications system 100 that supports parameterized codebooks for RIS-assisted communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support parameterized codebooks for RIS-assisted communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support RIS-assisted communications via a RIS 185. RIS-assisted communications may include communications between a transmitting entity and a receiving entity (e.g., the network entity 105 and the UE 115, or vice versa), where the transmitting entity transmits signals toward the RIS 185, and the RIS 185 reflects or refracts the signals toward the receiving device. In some cases, the RIS 185 may reflect or refract a signal anomalously (e.g., a reflection angle off of or refraction angle through the RIS is not equal to an incident angle of the signal to the RIS, a non-mirrored reflection or refraction) through the use of beamforming techniques, which the network entity 105 may configure by the use of a codeword in a codebook. Additionally, the RIS 185 may implement beamfocusing techniques, where a beamfocused beam is created by the RIS 185 based on a desired direction and a desired distance.

The network entity 105 may select a codebook for communication using the RIS 185 based on a location of the UE 115, where a codebook may contain codewords (e.g., configurations) corresponding to beams formed at the RIS. In some examples, codebooks may include codewords that implement beamfocusing in which a beam is shaped based on both a direction of the beam and a distance of the UE 115 from the RIS 185. In selecting codebooks, in some cases, the network entity may assume static geometries for a cascaded network entity-to-RIS-to-UE channel used to support a coverage area of the RIS. In such static geometries, a tradeoff may exist between selecting a relatively larger codebook or a relatively smaller codebook. For example, larger codebooks may be associated with higher beam overhead but higher coverage, while smaller codebooks may be associated with reduced beam overhead but also reduced coverage in some portions of the coverage area, for example, as smaller codebooks may contain less codewords (e.g., beams) to cover a same FOV as larger codebooks.

In accordance with techniques described herein, the network entity 105 may supports UE density-based codebook adjustment for RIS-assisted communications. Specifically, the network entity 105 may configure a codebook used for RIS-assisted communication based on dynamically changing UE densities (e.g., a measure of a quantity of UEs 115 per a specified area) such that codebooks may be tailored (e.g., sized, associated with a FOV, associated with one or more focal distances) for coverage areas with higher UE densities. As a result, codebooks associated with RIS-assisted communications may be tailored to focus on communications in smaller geographical regions, which may enable smaller codebooks to provide improved coverage (e.g., increased received power within the geographical regions). Additionally, while coverage may be sacrificed in other coverage areas due to the tailoring of codebooks to a higher UE density coverage area, the other coverage areas may have lower UE densities. Thus, adverse effects of the reduced coverage may be mitigated while providing the improved coverage to the higher UE density coverage area.

In one example, a network entity 105 may receive, from a network (e.g., the core network 130), an indication of a geographical region (e.g., region of interest) associated with a higher UE density (e.g., compared to one or more UE densities associated with one or more other geographical regions) and transmit a codebook to a controller associated with the RIS 185. The codebook may be associated with a set of parameters that may be based on the indicated geographical region. For example, the codebook may be selected to increase received power within the indicated geographical region, reduce beam overhead (e.g., as a result of confined regions, as a result of wider beams), or a combination thereof. For instance, the codebook may be selected by the network entity 105 such that the network entity 105 provides higher received power to the UEs 115 within the indicated geographical region. In some cases, the network and/or the network entity 105 may dynamically determine the geographical region based on (e.g., a priori) known or learned patterns of changing UE density over time and use codebooks that are tailored for the geographical region in accordance with the pattern.

Figure 2:
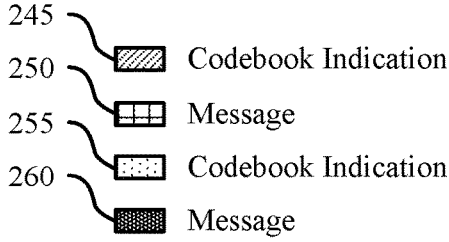
FIG. 2 shows an example of a wireless communications system that supports UE density-based codebook adjustment for RIS-assisted communications in accordance with one or more aspects of the present disclosure.

FIG. 2 shows an example of a wireless communications system 200 that supports UE density-based codebook adjustment for RIS-assisted communications in accordance with one or more aspects of the present disclosure. Aspects of the wireless communications system 200 may implement or be implemented by the wireless communications system 100. For example, wireless communications system 200 may include a network entity 105-a, one or more UEs 115, and a RIS 285, which may be examples of the network entity 105, the UE 115, and the RIS 185 of FIG. 1, respectively.

The wireless communications system 200 may support RIS-assisted communications between the network entity 105-a and UEs 115, such as to support communications around a blockage 210. The network entity 105-a may communicate with the UEs 115 using the RIS 285. For example, in the example of FIG. 2, the network entity 105-a may send transmissions (e.g., messages, indications) to (e.g., toward) the RIS 285 via a channel 220, and the RIS 285 may reflect (e.g., anomalously) the transmissions to the UEs 115 via a respective channel 225. In other examples, the RIS 285 may be operable to refract (e.g., anomalously) transmissions from the network entity 105-a to the UEs 115, and vice versa. In some examples, the channels 220 and 225 may be examples of communication links 125 described with reference to FIG. 1. In some examples, a channel from the network entity 105-a to a UE 115 using the RIS 285 may be referred to as a cascaded channel. For example, the channel 220 and a channel 225 may together be a cascaded channel between the network entity 105-a and a UE 115.

The UEs 115 may be located throughout geographical regions 205 (e.g., a geographical regions 205-a, a geographical regions 205-b, and a geographical region 205-c), which may be geographical regions (e.g., coverage areas) that are coverable (e.g., servable) by the RIS 285. In the example of FIG. 2, the geographical region 205-c may contain at least the geographical regions 205-a and 205-b. In some examples, the geographical regions 205 may be fixed. In some examples, the geographical regions 205 may be adjusted. For example, one or more of the geographical regions 205-a, 205-b, and 205-c may be smaller than a coverage area of the RIS 285 and may be adjusted to correspond to different regions within the coverage area of the RIS 285. Additionally, or alternatively, other quantities of geographical regions 205 may be configured.

In some examples, the geographical regions 205 may be associated with a near-field of the RIS 285. That is, the UEs 115 may be located near enough to the RIS 285 such that communications via the RIS 285 with the UEs 115 may be considered near-field communications and be subject to near-field effects (e.g., as compared to far-field communications).

The UEs 115 may move from one geographical region 205 to another, into a geographical region 205 from a geographical region that is uncovered by the RIS 285 (e.g., an out-of-coverage area), into the out-of-coverage area from a geographical region 205, or a combination thereof, over time. The movement of UEs 115 between, into, and out of the geographical regions 205 may be described by UE density patterns for respective geographical regions 205 over time. The geographical regions 205 may be associated with different distances (e.g., a range of distances 215-a and a range of distances 215-b) from the RIS 285, and may be associated with different FOVs 270 (e.g., a FOV 270-a, a FOV 270-b, and a FOV 270-c).

The RIS 285 may be controlled (e.g., configured, reconfigured) at least in part by a RIS controller 235. For example, the RIS controller 235 may be operable to adjust elements of the RIS that are operable to reflect or refract an incident signal based on a phase imposed on the incident signal by the elements of the RIS. For instance, the RIS controller 235 may adjust the phase imposed on the incident signal by each element of the RIS. In some cases, the RIS controller 235 may be co-located with the RIS 285. For example, the RIS controller 235 may be part of the RIS 285 used for communications between the network entity 105-a and the UEs 115. Additionally, or alternatively, a portion of or all of the RIS controller 235 may be separate from the RIS 285, and may communicate with the RIS 285, such as via a wired or wireless connection.

The blockage 210 may represent an obstacle preventing (e.g., impeding) direct wireless communications between the network entity 105-a and the UEs 115. For example, the blockage 210 may be an example of a building, a geographical feature (e.g., a mountain, land feature), an area with wireless communications restriction, or any combination thereof, among other objects that may impede direct transmission between the network entity 105-a and the UEs 115 (e.g., that prevents LOS communications between the network entity 105 a and the UE 115).

The network entity 105-*a* may support implementing codebooks that are tailored for (e.g., prioritize communications within) a geographical region 205 (e.g., rather than a coverage area of the RIS 285). A geographical region 205 for which a codebook is tailored may be referred to as a region of interest. In some examples, to support such codebook implementation, the network entity 105-*a* may receive an indication of a region of interest, such as the geographical region 205-*a* (although other geographical regions 205 may be indicated). The indication may be received from a separate network entity, the core network 130, or another entity of the wireless communications system 200. The geographical region 205-*a* may be associated with the FOV 270-*a*, the range of distances 215-*a*, or both. For example, the FOV 270-*a* may cover (e.g., include, span) the geographical region 205-*a*, and the geographical region 205-*a* may include the range of distances 215-*a* from the RIS 285 (e.g., within the FOV 270-*a*). It is noted that the range of distances 215 are depicted as lateral distances from the RIS 285 for illustrative clarity, and that a distance in a range of distances 215 may be a distance from the RIS 285 to a geographical region 205 (e.g., along an angle within a FOV 270 associated with the geographical region 205) or a perpendicular distance from the RIS 285.

The indication of the geographical region 205-*a* may be based on a UE density associated with the geographical region 205-*a*. For example, the indication may indicate the geographical region 205 with a greatest (e.g., relatively higher) UE density, and the geographical region 205-*a* may be associated with a UE density that is greater (e.g., higher) than the UE densities associated with the geographical region 205-*b* and the geographical region 205-*c*, respectively, such as at a first time. A UE density may be a measurement related to a quantity of UEs (e.g., such as the UE 115-*d*) per a unit of area, where the unit of area may be a geographical region, or another measure related to a geographical area (e.g., square miles, square feet, square kilometers, square meters).

The network entity 105-*a* may determine a first codebook to be used for communications using the RIS 285. The first codebook may be determined based on the indication of the geographical region 205-*a*. For example, the indication may indicate that the network entity 105-*a* is to determine (e.g., generate, select) a codebook having parameters that prioritize communications within the geographical region 205-*a* (e.g., and de-prioritize communications within other geographical regions 205). For example, the parameters of the codebook may prioritize communications within the geographical region 205-*a* (e.g., with UEs 115-*a* located in the geographical region 205-*a*) over communications in the geographical region 205-*b* (e.g., with UEs 115-*b* located in the geographical region 205-*b*) and the geographical region 205-*c*.

In some examples, the first codebook may be determined based on desired parameters for communications within the geographical region 205-*a*. For example, the desired parameters may include a desired FOV parameter (e.g., indicating a desired angular span for which a codebook may cause the RIS 285 to reflect or refract signals), a desired cardinality parameter (e.g., indicating a desired quantity of codewords in a codebook), one or more desired focal distance parameters (e.g., indicating one or more desired distances at which a codebook may cause the RIS 285 to focus reflected or refracted beams), or a combination thereof. In some examples, a focal distance may be referred to as a beamfocusing distance or a focusing distance. A realizable (e.g., possible) codebook may be associated with at least similar types of parameters, including an associated FOV, an associated cardinality, and one or more focal distances associated with codewords included in the codebook, or a combination thereof. In some cases, the network entity 105-*a* may have access to (e.g., store, receive an indication of) a set of codebooks and associated parameters for each of the codebooks of the set. The network entity 105-*a* may select the first codebook from the set of codebooks based on the desired parameters. Thus, the desired parameters may be based on the indication of the geographical region 205-*a*, and the first codebook may be determined based on the desired parameters and the parameters associated with the first codebook.

Additionally, or alternatively, the network entity 105-*a* may determine (e.g., generate, select) the first codebook such that the associated FOV spans at least the FOV 270-*a*. The network entity 105-*a* may determine the first codebook to consider (e.g., balance) beam overhead and receive power, for example, based on the associated cardinality, the one or more associated focal distances, or a combination thereof.

The network entity 105-*a* may transmit, to the RIS controller 235, a codebook indication 245 via a communication link 240. The codebook indication 245 may indicate to the RIS controller 235 the first codebook to be used for communicating using the RIS 285. For example, transmitting the codebook indication 245 may include transmitting the first codebook, or transmitting an indication of an index (e.g., identifier) of the first codebook in the set of codebooks known to (e.g., stored by) the RIS controller 235.

The network entity 105-*a* may communicate one or more messages 250 to one or more of the UEs 115 located in the geographical region 205-*a* via the RIS 285 in accordance with the first codebook. For example, the first codebook may contain codewords which configure the RIS 285 to reflect or refract the one or more messages 250 within the FOV 270-*a* (e.g., and focused at, near, or within one or more distances of the range of distances 215-*a*).

In some cases, the one or more messages 250 may include a series of transmissions that are a part of a beam sweeping operation within (e.g., spanning, across) the geographical region 205-*a*. The network entity 105-*a* may perform the beam sweeping operation using the RIS 285 and in accordance with the first codebook. For example, the one or more messages 250 may be a series of synchronization signal block (SSB) transmissions that are each transmitted in accordance with a respective codeword of the first codebook. The messages 250 of the beam sweeping operation may be received by one or more UEs 115-*a* located in the geographical region 205-*a*. In some cases, the beam sweeping operation may aid in configuring wireless communications between the UEs 115-*a* located in the geographical region 205-*a* and the network entity 105-*a*. For example, one or more of the UEs 115-*a* may measure the SSB transmissions and indicate one or more preferred SSBs (e.g., corresponding to one or more codewords of the first codebook) to the network entity 105-*a* via the RIS 285. The network entity 105-*a* may communicate with the one or more UEs 115-*a* in accordance with the respective one or more codewords (e.g., via the RIS 285 using beams corresponding to the respective one or more codewords).

The UEs 115-*a* may experience an enhanced wireless connection with the network entity 105-*a* because of the use of the first codebook, for example, as compared to a wireless connection experienced by the UEs 115-*a* if using a codebook that is tailored for a geographical region 205 that is larger than the geographical region 205-*a*. For example, the UEs 115-*a* may experience less latency and a higher received power from the network entity 105-*a* in association with communicating using the RIS 285.

At a time after the reception of the indication of the geographical region 205-*a* (e.g., after the first time), the network entity 105-*a* may receive a second indication of a second geographical region 205, such as the geographical region 205-*b* or the geographical region 205-*c*, corresponding to an updated region of interest for which the network entity 105-*a* is to prioritize communications. For example, a UE density associated with the geographical region 205-*b* may have changed to become greater than the UE density associated with the geographical region 205-*a*. In another example, the UE density associated with the geographical region 205-*c* may have changed to become greater than the UE density associated with the geographical region 205-*a*. In another example, the UE densities of the geographical region 205-*a* and 205-*b* may each be great enough such that the network entity 105-*a* is to provide coverage for both geographical regions 205-*a* and 205-*b*. Thus, the second indication of the updated region of interest may indicate the geographical region 205-*c* (e.g., or indicate both of the geographical regions 205-*a* and 205-*b*), for example, such that the network entity 105-*a* prioritizes a region of interest that covers both the geographical regions 205-*a* and 205-*b*.

In some cases, the second indication may be based on a pattern of UE densities in respective geographical regions 205 over time. For example, the change of the UE density in the geographical region 205-*b* may occur in accordance with a pattern of UE densities in the geographical region 205-*b* over time. In one example, the pattern of UE densities for the geographical region 205-*a* and the geographical region 205-*b* may be such that the UE density associated with the geographical region 205-*a* is the greater of the two in the morning, and the UE density associated with the geographical region 205-*b* changes to be the greater of the two in the evenings. As such, the region of interest may correspond to the geographical region 205-*a* in the mornings and may be updated to correspond to the geographical region 205-*b* in the evenings. It is noted that the quantity of geographical regions 205 and the patterns illustrated herein are merely examples, and any quantity of geographical regions 205 as well as any kind of pattern (e.g., daily patterns, weekly patterns, monthly patterns, yearly patterns) may be supported. The pattern of UE densities may be known to the network entity 105-*a*, the RIS controller 235, or any combination thereof. In some examples, the pattern of UE densities may be available to the network entity 105-*a* such that the network entity 105-*a* may determine a region of interest and/or an updated region of interest in accordance with the pattern and without receiving an indication of the region of interest.

In some cases, the network entity 105-*a* may receive the second indication based on a deviation in the UE density in one or more of the geographical regions 205 from the patterns of UE densities for the respective one or more of the geographical regions 205. For example, an entity of the wireless communications system 200 (e.g., the core network 130, the network entity 105-*a*) may determine (e.g., identify) a threshold change from the pattern of UE densities for one or more of the geographical regions 205. That is, the UE density associated with one or more of the geographical regions 205 may deviate from respective patterns of UE densities associated with the geographical regions 205 such that the deviation satisfies the threshold change (e.g., the UE density becomes higher or lower than what the pattern predicts by more than (e.g., or equal to) the threshold change). As a result, in some cases, actual UE densities of the one or more geographical regions 205 may be different than that predicted by the pattern such that a different geographical region 205 (e.g., the geographical region 205-*b* or 205-*c*) has a higher actual UE density than the geographical region 205-*a* or has an actual UE density such that the region of interest should be expanded to cover an additional geographical region 205. As such, the second indication may be received to indicate the updated region of interest based on the threshold deviation from the one or more patterns of UE densities.

In some cases, the second indication may indicate one or more of the geographical regions 205. For example, the second indication may indicate the geographical region 205-*c*, containing the geographical regions 205-*a* and 205-*b*, or may indicate both of the geographical regions 205-*a* and 205-*b*.

In some cases, the second geographical region may be associated with the same FOV as the geographical region 205-*a* (e.g., be in the same direction, cover a same angular span), but associated with one or more focal distances different from one or more focal distance associated with the geographical region 205-*a*. For example, the second geographical region 205 may be a geographical region 205 with the FOV 270-*a* (e.g., the anomalous directions for the RIS 285 to reflect or refract an incident beam does not change), but associated with a different range of distances 215 (e.g., the range of distances 215-*b*, for example, such that beams may be focused differently).

The network entity 105-*a* may determine a second codebook to be used for communications using the RIS 285 based on the second indication. For example, the second codebook may be determined based on second desired parameters determined by the network entity 105-*a*, such as being selected from a set of codebooks based on the second desired parameters, as described herein. Additionally, or alternatively, the network entity 105-*a* may determine Additionally, or alternatively, the network entity 105-*a* may determine (e.g., generate, select) the second codebook such that the associated FOV spans a FOV 270 associated with the updated region of interest and that considers (e.g., balance) beam overhead and receive power.

In some cases, one or more of the parameters associated with the first codebook may be the same as one or more of the parameters associated with the second codebook. For example, the first codebook and the second codebook may be associated with a same FOV parameter, but may each be associated with one or more different focal distance parameters, respectively (e.g., the codebooks are associated with a same angular span but include codewords that support beamfocusing at different distances).

In some cases, the first codebook and the second codebook may be associated with a same FOV parameter and a same focal distance parameter, but may each be associated with a different cardinality parameter. For example, the first codebook and the second codebook may both be associated with the FOV 270-*a*, but the second codebook may be associated with a higher cardinality (e.g., contain more codewords) than the first codebook and thus increase the network connectivity (e.g., coverage, received power) experienced by the UEs 115-*b* (e.g., at the cost of increased beam overhead).

In some cases, the first codebook and the second codebook may be associated with different respective FOV parameters and may each be associated with a same cardinality parameter. For example, the first codebook may be associated with the FOV 270-*a*, and the second codebook may both be associated with the FOV **270-*c* (e.g., a larger geographic area). Here, the first codebook and the second codebook may be associated with a same cardinality (e.g., contain the same quantity of codewords). The network connectivity experienced by the UEs 115 may increase or decrease as a result, for example, depending on a location of the UEs 115 within the geographical regions 205**.

In some cases, the first codebook and the second codebook may be associated with different respective FOV parameters and may each be associated with different respective cardinality parameters based on the different respective FOV parameters. For example, the second codebook may be associated with the FOV **270-*c* (e.g., a larger FOV) and the first codebook may be associated with the FOV 270-*a* (e.g., a smaller FOV). In some examples, the second codebook may be associated with a higher cardinality to provide a network connectivity to the UEs 115 throughout the FOV 270-*c* similar to the network connectivity provided via the first codebook to the UEs 115-*a* in the FOV 270-*a***.

In some cases, the network entity **105-*a* may determine to serve the geographical region 205-*a* and the geographical region 205-*b* simultaneously based on the second indication. For example, if the network entity 105-*a* determines that the UE density associated with the geographical region 205-*b* is close (e.g., within a threshold) to the UE density associated with the geographical region 205-*a* based on the second indication, the second codebook may be determined to prioritize communications within the geographical region 205-*a* and the geographical region 205-*b***.

The network entity **105-*a* may transmit, to the RIS controller 235, a codebook indication 255 indicating the second codebook to be used for communicating using the RIS 285. Transmitting the second codebook indication may include transmitting the second codebook, or transmitting an index (e.g., identifier) of the second codebook in the set of codebooks known to the RIS controller 235**.

The network entity **105-*a* and one or more UEs 115 within the second geographical region 205 may communicate one or more messages 260 via the RIS 285 in accordance with the second codebook. The one or more messages 260 may be examples of the one or more messages 250**.

In some cases, the network entity **105-*a* may receive one or more secure control messages including respective positioning information associated with groups of the UEs 115 over one or more durations. For example, the secure control message may contain positioning information associated with a group of the UEs 115 located in the geographical region 205-*a*, positioning information associated with a group of the UEs 115 located in the geographical region 205-*b*, or both. The positioning information may be gathered (e.g., accumulated) by the core network 130**. Additionally, the one or more respective durations may include durations of the day (e.g., morning, afternoon, evening, night), days of the week, or any other duration.

The network entity **105-*a* may receive the one or more secure control messages from the core network 130, and may receive the one or more secure control messages before or with the indication of a region of interest. In some cases, the network entity 105-*a* may determine that the UE density associated with the second geographical region 205 is greater than the UE density associated with the geographical region 205-*a* based on the respective positioning information. For example, the network entity 105-*a* may calculate a UE density for each of the geographical regions 205 using the position information associated with the respective geographical regions 205 and compare the calculated UE densities to determine which is the largest at a specified time or over a specified duration. In some examples, the network entity 105-*a* may determine a region of interest based on the calculated UE densities. In some examples, the network entity 105-*a* may determine one or more patterns of UE densities based on the respective positioning information. For example, the network entity 105-*a* may use the positioning information to determine short-term and/or long term UE densities in an angular and/or distance region. Additionally, or alternatively, the core network 130 may determine the one or more patterns of UE densities using the respective positioning information and indicate the one or more patterns to the network entity 105-*a***, such as via one or more secure control messages.

Figure 3:
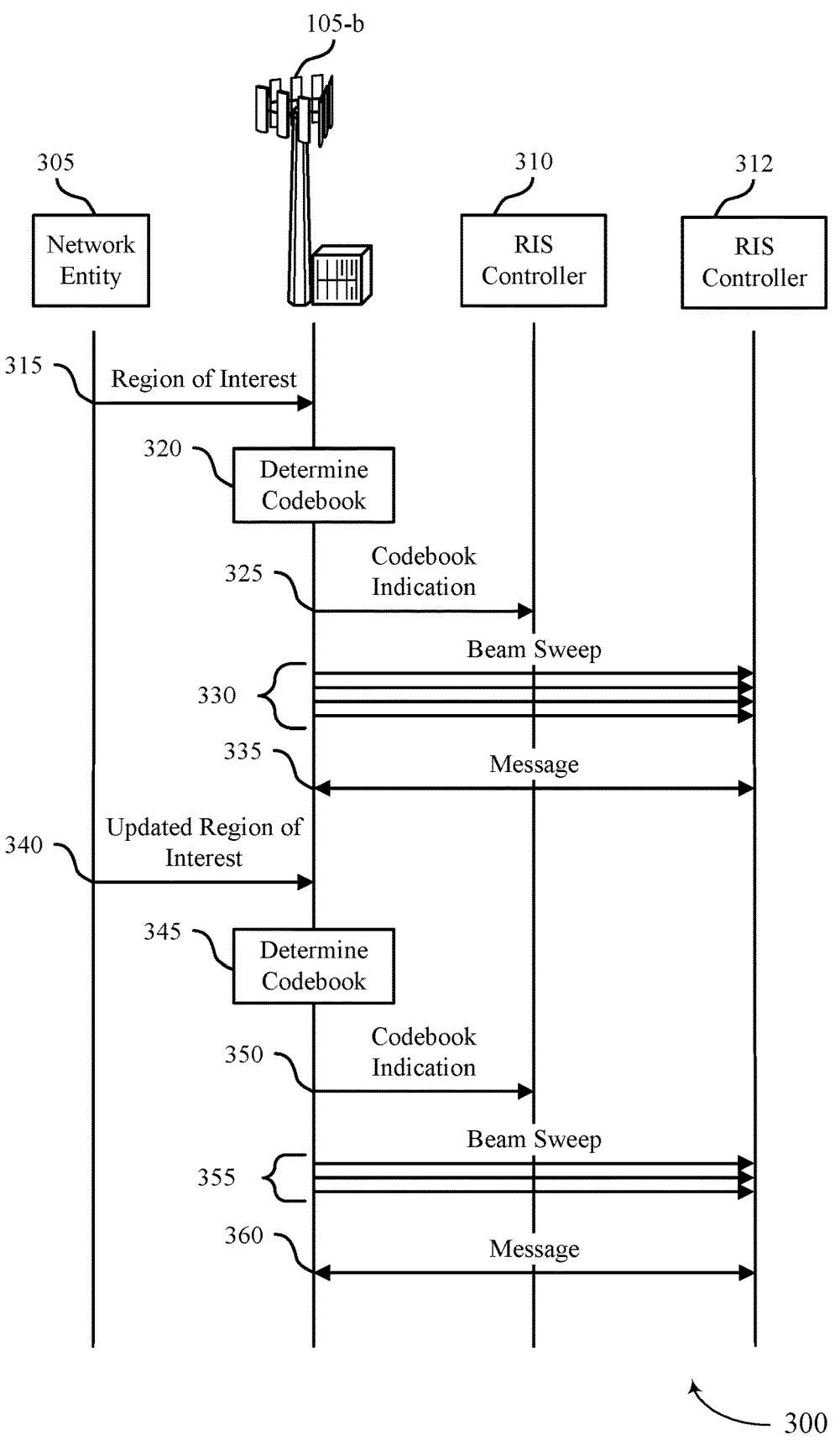
FIG. 3 shows an example of a process flow that supports UE density-based codebook adjustment for RIS-assisted communications in accordance with one or more aspects of the present disclosure.

FIG. 3 shows an example of a process flow 300 that supports UE density-based codebook adjustment for RIS-assisted communications in accordance with one or more aspects of the present disclosure. Aspects of the process flow 300 may implement or be implemented by the wireless communications system 100, the wireless communications system 200, or both. For example, the process flow 300 may be implemented by a network entity **105-*b* and one or more UEs 115, which may be examples of the corresponding devices described herein, including with reference to FIGS. 1 and 2. The process flow may further be implemented by a network entity 305, which may be an example of a network entity 105 or a core network 130 (e.g., a function of the core network 130) as described herein, including with reference to FIGS. 1 and 2. In some examples, the network entity 305 may be part of the network entity 105-*b* or co-located with the network entity 105-*b*. Additionally, the process flow 300 may be implemented by a RIS controller 310 and RIS 312, which may be examples of a RIS controller 235 and a RIS 285 described with reference to FIG. 2**.

In the following description of the process flow 300, the operations between the network entity 305, the network entity **105-*b*, the RIS controller 310, and the RIS 312 may be performed in a different order than the example order shown. Some operations may also be omitted from the process flow 300, and other operations may be added to the process flow 300. Further, although some operations or signaling may be shown to occur at different times for discussion purposes, these operations may actually occur at the same time At 315, the network entity 305 may transmit, to the network entity 105-*b*, an indication of a region of interest for which the network entity 105-*b* is to prioritize communications. The region of interest may correspond to a first geographical region coverable by the RIS 312 associated with the RIS controller 310. The first geographical region may be associated with a FOV from the RIS 312, a distance from the RIS 312**, or both. The first geographical region may be associated with a UE density that is greater than one or more UE densities associated with one or more other geographical regions.

At 320, the network entity **105-*b* may determine a first codebook to be used for communications using the RIS 312. The network entity 105-*b* may determine the first codebook based on the indication of the first geographical region at 315. For example, the indication may indicate that the network entity 105-*b* is to determine the first codebook such that communications within the first geographical region are prioritized. For instance, the first codebook may include codewords corresponding to beams within a first FOV of the first geographical region. The first FOV may be smaller than a FOV associated with (e.g., realizable by) the RIS 312**. As such, a reduced quantity of codewords may be included in the first codebook to provide coverage for the first FOV (e.g., relative to providing coverage for the FOV of the RIS). Additionally, or alternatively, higher granularity coverage within the first FOV may be provided, for example, due to the angular span covered by the first FOV being smaller, among other benefits.

In some examples, beam overhead associated with UE-density based codebook implementations may be decreased, for example, by leveraging the use of relatively wider beams if a geographical region is located near to the RIS 312. For example, if the first geographical region is located within a threshold distance from the RIS 312, the network entity 105-b may use relatively wider beams to cover the first FOV of the first geographical region (e.g., while providing a relatively high receive power to the UEs 115). As such, the first codebook may be determined that have a relatively lower quantity of codewords associated with the wider beams to cover the FOV, thereby reducing beam overhead.

At 325, the network entity 105-b may transmit, to the RIS controller 310, a first codebook indication of the first code-book to use for communicating using the RIS 312 associated with the RIS controller 310. For example, the first codebook indication may include the first codebook or an indication of (e.g., an index of, an identifier of) the first codebook in a set of codebooks known to (e.g., stored by) the RIS controller 310.

At 330, the network entity 105-b may perform a beam sweeping operation in the first geographical region. The network entity 105-b may perform the beam sweeping operation using the RIS 312 and in accordance with the first codebook. For example, the network entity 105-b may transmit a set of SSBs to one or more UEs 115 using the RIS, where each SSB is transmitted in accordance with a respective codeword of the first codebook. For instance, if the first codebook includes four codewords, the network entity 105-b may transmit four SSBs to the one or more UEs 115 via the RIS 312, each SSB transmitted via the RIS 312 using a beam corresponding to one of the four codewords.

At 335, the network entity 105-b and the one or more UEs 115 may communicate one or more messages via the RIS 312 based on the beam sweeping operation. For example, the one or more UEs 115 and the network entity 105-b may communicate the one or more messages via the RIS 312 using one or more of beams corresponding to one or more codewords of the first codebook (e.g., selected based on the beam sweeping operation).

At 340, the network entity 305 may transmit an indication of an updated region of interest for which the network entity 105-b is to prioritize communications. For example, the network entity 305 may indicate a second geographical region of the one or more geographical regions to the network entity 105-b, where the second geographical region may be different than the first geographical region. In some examples, the network entity 305 may indicate the second geographical region based on a change of UE densities such that the second geographical region has a greater UE density than the first UE density, such as in accordance with a pattern of UE densities over time or based on a deviation from the pattern.

In some cases, the indication of the second geographical region may include one or more other geographical regions. For example, the indication of the second geographical region may indicate a third geographical region, where the third geographical region may include the first geographical region and the second geographical region.

Additionally, or alternatively, the second geographical region may be associated with the same FOV as the first geographical region (e.g., be in the same direction) but may be associated with a focal distance different from a focal distance associated with the first geographical region. For example, the FOV associated with the second geographical region may be the same as the FOV associated with the first geographical region (e.g., the anomalous direction for the RIS to reflect or refract an incident beam does not change), but the one or more focal distances associated with the second geographical region may be different than the one or more focal distances associate with the first geographical region (e.g., the selected beam may still change).

At 345, the network entity 105-b may determine a second codebook to be used for communications using the RIS 312 based on the indication of the second geographical region. For example, the second codebook may be determined to prioritize communications within the second geographical region.

In some cases, one or more of the parameters associated with the first codebook may be the same as one or more of the parameters associated with the second codebook. For example, the first codebook and the second codebook may be associated with a same FOV parameter, but may each be associated with one or more different focal distance parameters, respectively (e.g., the codebooks are associated with a same direction but different distances).

In some cases, the first codebook and the second codebook may be associated with a same FOV parameter and a same focal distance parameter, but may each be associated with a different cardinality parameter. For example, the first codebook and the second codebook may cause the RIS 312 to reach a same geographical region, but the second codebook may contain more codewords than the first codebook.

In some cases, the first codebook and the second codebook may be associated with different respective FOV parameters, and may each be associated with different respective cardinality parameters based on the different respective FOV parameters. For example, the second codebook may be associated with a larger FOV than the first codebook. In such an example, the second codebook may be associated with a higher cardinality than the first codebook, for example, to provide a network connectivity throughout the larger FOV similar to that provided by the first codebook throughout the smaller FOV.

In some cases, the network entity 105-b may determine, based on the indication of the second geographical region, that both the first geographical region and the second geographical region will be served simultaneously. In some cases, the network entity 105-b may determine to serve the first geographical region and the second geographical region simultaneously if the network entity 105-b determines that the UE density associated with the second geographical region is close (e.g., within a threshold) to the UE density associated with the first geographical region, based on the indication of the second geographical region. Additionally, or alternatively, the network entity 105-b may determine the second codebook to be associated with parameters based on a third geographical region, where the third geographical region includes the first geographical region and the second geographical region.

In some examples, the updated region of interest may indicate a shorter UE distance range for which the RIS 312 may support the use of wider beams such that a smaller quantity of codewords may be included in the second codebook relative to the first codebook. In some examples, the updated region of interest may indicate a greater UE distance range for which the RIS 312 may be unable to support the use of wider beams (e.g., while the first geographical region may support the use of wider beams) such that a greater quantity of codewords may be included in the second codebook relative to the first codebook.

At 350, the network entity 105-b may transmit, to the RIS controller 310, a second codebook indication of the second codebook to use for communicating using the RIS 312.

At 355, the network entity 105-b may perform a beam sweeping operation in the second geographical region. The network entity 105-b may perform the beam sweeping operation using the RIS 312 and in accordance with the second codebook. For example, if the second codebook includes three codewords, the network entity 105-b may transmit three SSBs to one or more UEs 115 within the second geographical region via the RIS 312, each SSB transmitted via the RIS 312 using a beam corresponding to one of the three codewords.

At 360, the network entity 105-b and the one or more UEs 115 within the second geographical region may communicate one or more messages via the RIS 312 based on the beam sweeping operation in the second geographical region.

Figure 4:
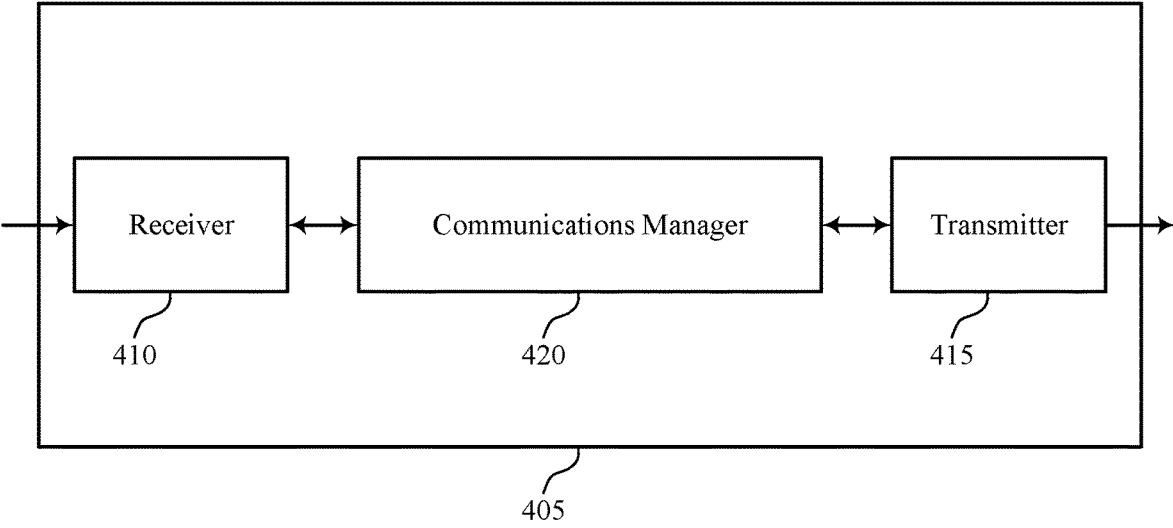
FIGS. 4 and 5 show block diagrams of devices that support UE density-based codebook adjustment for RIS-assisted communications in accordance with one or more aspects of the present disclosure.

FIG. 4 shows a block diagram 400 of a device 405 that supports UE density-based codebook adjustment for RIS-assisted communications in accordance with one or more aspects of the present disclosure. The device 405 may be an example of aspects of a network entity 105 as described herein. The device 405 may include a receiver 410, a transmitter 415, and a communications manager 420. The device 405, or one or more components of the device 405 (e.g., the receiver 410, the transmitter 415, and the communications manager 420), may include one or more processors, which may be coupled with one or more memories, to, individually or collectively, support or enable the described techniques. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations thereof or various components thereof may be examples of means for performing various aspects of UE density-based codebook adjustment for RIS-assisted communications as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing instructions stored in the one or more memories).

Additionally, or alternatively, the communications manager 420, the receiver 410, the transmitter 415, or various combinations or components thereof may be implemented in code (e.g., as communications management software or firmware) executed by one or more processors. If implemented in code executed by one or more processors, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a network entity in accordance with examples as disclosed herein. For example, the communications manager 420 is capable of, configured to, or operable to support a means for receiving a first indication of a first geographical region associated with a first UE density that is greater than a second UE density associated with a second geographical region. The communications manager 420 is capable of, configured to, or operable to support a means for transmitting, to a controller associated with a RIS, a second indication of a codebook for communication using the RIS, the codebook associated with a set of parameters that is based on the first indication of the first geographical region. The communications manager 420 is capable of, configured to, or operable to support a means for performing, using the RIS in accordance with the codebook, a beam sweeping operation in the first geographical region.

By including or configuring the communications manager 420 in accordance with examples as described herein, the device 405 (e.g., one or more processors controlling or otherwise coupled with the receiver 410, the transmitter 415, the communications manager 420, or a combination thereof) may support techniques for reduced processing and more efficient utilization of communication resources in association with communication using a RIS. For example, the device 405 may use less processing and communication resources to transmit and implement a smaller codebook to the RIS based on prioritizing serving a smaller geographic location.

Figure 5:
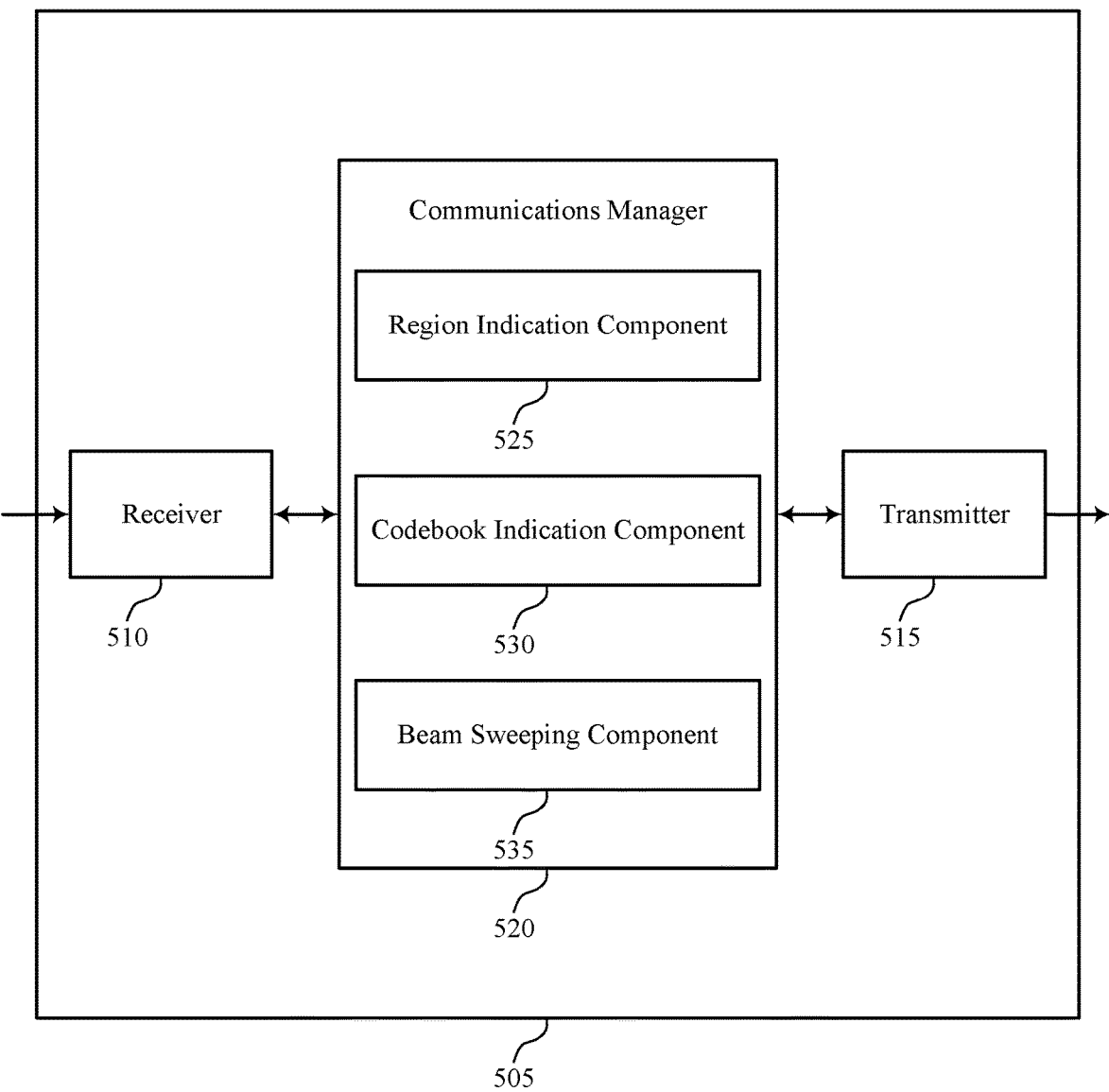

FIG. 5 shows a block diagram 500 of a device 505 that supports UE density-based codebook adjustment for RIS-assisted communications in accordance with one or more aspects of the present disclosure. The device 505 may be an example of aspects of a device 405 or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include one or more processors, which may be coupled with one or more memories, to support the described techniques. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of UE density-based codebook adjustment for RIS-assisted communications as described herein. For example, the communications manager 520 may include a region indication component 525, a codebook indication component 530, a beam sweeping component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a network entity in accordance with examples as disclosed herein. The region indication component 525 is capable of, configured to, or operable to support a means for receiving a first indication of a first geographical region associated with a first UE density that is greater than a second UE density associated with a second geographical region. The codebook indication component 530 is capable of, configured to, or operable to support a means for transmitting, to a controller associated with a RIS, a second indication of a codebook for communication using the RIS, the codebook associated with a set of parameters that is based on the first indication of the first geographical region. The beam sweeping component 535 is capable of, configured to, or operable to support a means for performing, using the RIS in accordance with the codebook, a beam sweeping operation in the first geographical region.

Figure 6:
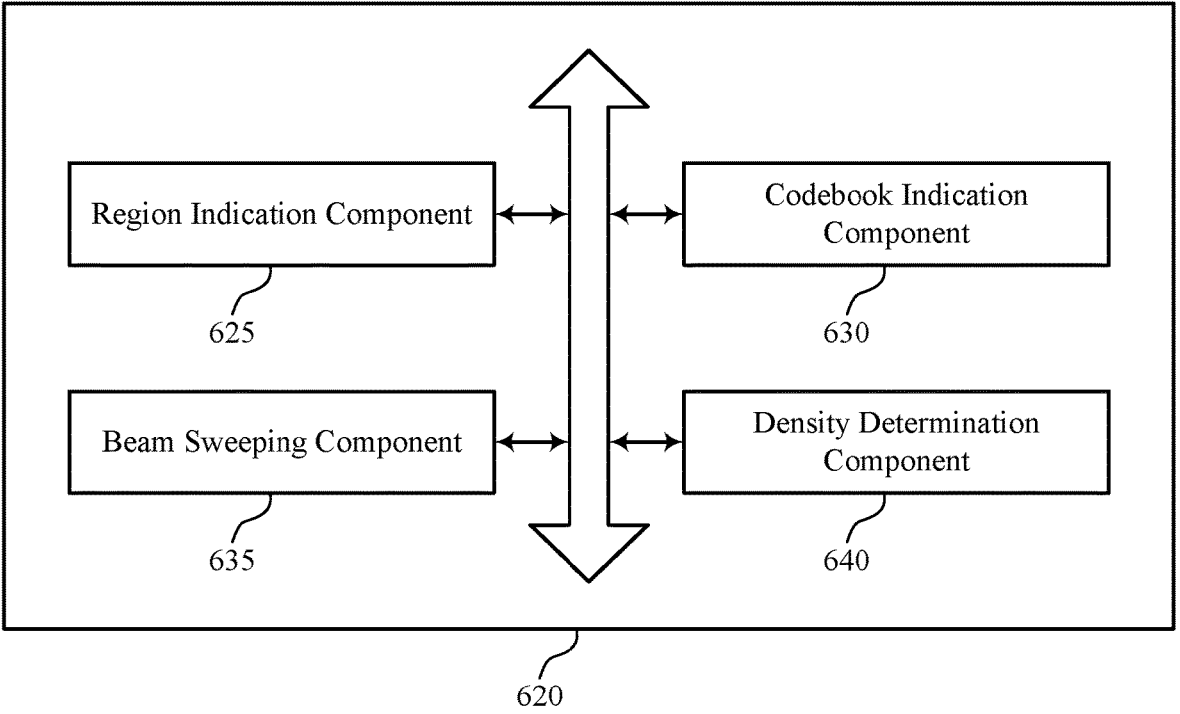
FIG. 6 shows a block diagram of a communications manager that supports UE density-based codebook adjustment for RIS-assisted communications in accordance with one or more aspects of the present disclosure.

FIG. 6 shows a block diagram 600 of a communications manager 620 that supports UE density-based codebook adjustment for RIS-assisted communications in accordance with one or more aspects of the present disclosure. The communications manager 620 may be an example of aspects of a communications manager 420, a communications manager 520, or both, as described herein. The communications manager 620, or various components thereof, may be an example of means for performing various aspects of UE density-based codebook adjustment for RIS-assisted communications as described herein. For example, the communications manager 620 may include a region indication component 625, a codebook indication component 630, a beam sweeping component 635, a density determination component 640, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communications at a network entity in accordance with examples as disclosed herein. The region indication component 625 is capable of, configured to, or operable to support a means for receiving a first indication of a first geographical region associated with a first UE density that is greater than a second UE density associated with a second geographical region. The codebook indication component 630 is capable of, configured to, or operable to support a means for transmitting, to a controller associated with a RIS, a second indication of a codebook for communication using the RIS, the codebook associated with a set of parameters that is based on the first indication of the first geographical region. The beam sweeping component 635 is capable of, configured to, or operable to support a means for performing, using the RIS in accordance with the codebook, a beam sweeping operation in the first geographical region.

In some examples, the codebook indication component 630 is capable of, configured to, or operable to support a means for transmitting, to the controller after performing the beam sweeping operation, a third indication of a second codebook for the communication using the RIS based on a change of the second UE density to be greater than the first UE density, the second codebook associated with a second set of parameters that is based on the second geographical region. In some examples, the beam sweeping component 635 is capable of, configured to, or operable to support a means for performing, using the RIS in accordance with the second codebook, a second beam sweeping operation in the second geographical region.

In some examples, the density determination component 640 is capable of, configured to, or operable to support a means for determining that the second UE density changed to be greater than the first UE density in accordance with a pattern of UE densities in respective geographical regions over time, where the third indication is transmitted based on the determining.

In some examples, the region indication component 625 is capable of, configured to, or operable to support a means for receiving, before transmitting the third indication, a fourth indication of the second geographical region based on the change of the second UE density to be greater than the first UE density, where the third indication is transmitted based on the fourth indication.

In some examples, the change of the second UE density satisfies a threshold change from a pattern of UE densities in the second geographical region over time. In some examples, the fourth indication is received based on the change of the second UE density satisfying the threshold change.

In some examples, the set of parameters includes a first quantity of codewords included in the codebook and the second set of parameters includes a second quantity of codewords included in the second codebook. In some examples, the second quantity of codewords is different than the first quantity of codewords based on the first geographical region being a first distance from the RIS that is different than a second distance of the second geographical region from the RIS.

In some examples, the set of parameters includes at least one of a first FOV associated with the first geographical region, one or more first focal distances associated with the first geographical region, and a first quantity of codewords included in the codebook. In some examples, the second set of parameters includes at least one of a second FOV associated with the second geographical region, one or more second focal distances associated with the second geographical region, and a second quantity of codewords included in the second codebook.

In some examples, the first quantity of codewords is different than the second quantity of codewords based on the first FOV being different than the second FOV.

In some examples, the first FOV is the same as the second FOV and the one or more first focal distances are different than the one or more second focal distances.

In some examples, the set of parameters includes at least one of a FOV associated with the first geographical region, one or more focal distances from the RIS, and a quantity of codewords included in the codebook.

In some examples, to support receiving the first indication, the region indication component 625 is capable of, configured to, or operable to support a means for receiving, via one or more secure control messages, first positioning information associated with UEs located in the first geographical region over one or more durations and second positioning information associated with UEs located in the second geographical region over the one or more durations, where the first UE density is determined to be greater than the second UE density based on the first positioning information and the second positioning information.

In some examples, the first indication indicates that the network entity is to determine the set of parameters associated with the codebook to prioritize communications within the first geographical region over the second geographical region or a combination of the first geographical region and the second geographical region.

In some examples, the codebook indication component 630 is capable of, configured to, or operable to support a means for transmitting, to the controller after performing the beam sweeping operation, a third indication of a second codebook for the communication using the RIS based on a change of the first UE density, a change of the second UE density, or both, the second codebook associated with a second set of parameters that is based on a third geographical region including the first geographical region and the second geographical region. In some examples, the beam sweeping component 635 is capable of, configured to, or operable to support a means for performing, using the RIS in accordance with the second codebook, a second beam sweeping operation in the third geographical region.

In some examples, the set of parameters includes a first quantity of codewords included in the codebook and the second set of parameters includes a second quantity of codewords included in the second codebook. In some examples, the second quantity of codewords is greater than the first quantity of codewords based on the third geographical region being larger than the first geographical region.

Figure 7:
FIG. 7 shows a diagram of a system including a device that supports UE density-based codebook adjustment for RIS-assisted communications in accordance with one or more aspects of the present disclosure.

FIG. 7 shows a diagram of a system 700 including a device 705 that supports UE density-based codebook adjustment for RIS-assisted communications in accordance with one or more aspects of the present disclosure. The device 705 may be an example of or include the components of a device 405, a device 505, or a network entity 105 as described herein. The device 705 may communicate with one or more network entities 105, one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, one or more memories 725, code 730, and one or more processors 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof. In some implementations, the transceiver 710 may include or be configured for coupling with one or more processors or one or more memory components that are operable to perform or support operations based on received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or one or more memory components (e.g., the one or more processors 735, the one or more memories 725, or both), may be included in a chip or chip assembly that is installed in the device 705. In some examples, the transceiver 710 may be operable to support communications via one or more communications links (e.g., a communication link 125, a backhaul communication link 120, a midhaul communication link 162, a fronthaul communication link 168).

The one or more memories 725 may include RAM, ROM, or any combination thereof. The one or more memories 725 may store computer-readable, computer-executable code 730 including instructions that, when executed by one or more of the one or more processors 735, cause the device 705 to perform various functions described herein. The code 730 may be stored in a non-transitory computer-readable medium such as system memory or another type of memory. In some cases, the code 730 may not be directly executable by a processor of the one or more processors 735 but may cause a computer (e.g., when compiled and executed) to perform functions described herein. In some cases, the one or more memories 725 may contain, among other things, a BIOS which may control basic hardware or software operation such as the interaction with peripheral components or devices. In some examples, the one or more processors 735 may include multiple processors and the one or more memories 725 may include multiple memories. One or more of the multiple processors may be coupled with one or more of the multiple memories which may, individually or collectively, be configured to perform various functions herein (for example, as part of a processing system).

The one or more processors 735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the one or more processors 735 may be configured to operate a memory array using a memory controller. In some other cases, a memory controller may be integrated into one or more of the one or more processors 735. The one or more processors 735 may be configured to execute computer-readable instructions stored in a memory (e.g., one or more of the one or more memories 725) to cause the device 705 to perform various functions (e.g., functions or tasks supporting UE density-based codebook adjustment for RIS-assisted communications). For example, the device 705 or a component of the device 705 may include one or more processors 735 and one or more memories 725 coupled with one or more of the one or more processors 735, the one or more processors 735 and the one or more memories 725 configured to perform various functions described herein.

The one or more processors 735 may be an example of a cloud-computing platform (e.g., one or more physical nodes and supporting software such as operating systems, virtual machines, or container instances) that may host the functions (e.g., by executing code 730) to perform the functions of the device 705. The one or more processors 735 may be any one or more suitable processors capable of executing scripts or instructions of one or more software programs stored in the device 705 (such as within one or more of the one or more memories 725). In some implementations, the one or more processors 735 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the one or more processors 735, or the transceiver 710, or the communications manager 720, or other components or combinations of components of the device 705. The processing system of the device 705 may interface with other components of the device 705, and may process information received from other components (such as inputs or signals) or output information to other components. For example, a chip or modem of the device 705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the one or more memories 725, the code 730, and the one or more processors 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communications at a network entity in accordance with examples as disclosed herein. For example, the communications manager 720 is capable of, configured to, or operable to support a means for receiving a first indication of a first geographical region associated with a first UE density that is greater than a second UE density associated with a second geographical region. The communications manager 720 is capable of, configured to, or operable to support a means for transmitting, to a controller associated with a RIS, a second indication of a codebook for communication using the RIS, the codebook associated with a set of parameters that is based on the first indication of the first geographical region. The communications manager 720 is capable of, configured to, or operable to support a means for performing, using the RIS in accordance with the codebook, a beam sweeping operation in the first geographical region.

By including or configuring the communications manager 720 in accordance with examples as described herein, the device 705 may support techniques for improved communication reliability, improved coverage, reduced signaling overhead, improved codebook selection, and reduced latency in association with communication using a RIS.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the transceiver 710, one or more of the one or more processors 735, one or more of the one or more memories 725, the code 730, or any combination thereof (for example, by a processing system including at least a portion of the one or more processors 735, the one or more memories 725, the code 730, or any combination thereof). For example, the code 730 may include instructions executable by one or more of the one or more processors 735 to cause the device 705 to perform various aspects of UE density-based codebook adjustment for RIS-assisted communications as described herein, or the one or more processors 735 and the one or more memories 725 may be otherwise configured to, individually or collectively, perform or support such operations.

FIG. 8 shows a flowchart illustrating a method 800 that supports UE density-based codebook adjustment for RIS-assisted communications in accordance with aspects of the present disclosure. The operations of the method 800 may be implemented by a network entity or its components as described herein. For example, the operations of the method 800 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 805, the method may include receiving a first indication of a first geographical region associated with a first UE density that is greater than a second UE density associated with a second geographical region. The operations of block 805 may be performed in accordance with examples as disclosed herein. In some examples, aspects of the operations of 805 may be performed by a region indication component 625 as described with reference to FIG. 6.

At 810, the method may include transmitting, to a controller associated with a RIS, a second indication of a codebook for communication using the RIS, the codebook associated with a set of parameters that is based at least in part on the first indication of the first geographical region. The operations of block 810 may be performed in accordance with examples as disclosed herein. In some examples, aspects of the operations of 810 may be performed by a codebook indication component 630 as described with reference to FIG. 6.

At 815, the method may include performing, using the RIS in accordance with the codebook, a beam sweeping operation in the first geographical region. The operations of block 815 may be performed in accordance with examples as disclosed herein. In some examples, aspects of the operations of 815 may be performed by a beam sweeping component 635 as described with reference to FIG. 6.

FIG. 9 shows a flowchart illustrating a method 900 that supports UE density-based codebook adjustment for RIS-assisted communications in accordance with aspects of the present disclosure. The operations of the method 900 may be implemented by a network entity or its components as described herein. For example, the operations of the method 900 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 905, the method may include receiving a first indication of a first geographical region associated with a first UE density that is greater than a second UE density associated with a second geographical region. The operations of block 905 may be performed in accordance with examples as disclosed herein. In some examples, aspects of the operations of 905 may be performed by a region indication component 625 as described with reference to FIG. 6.

At 910, the method may include transmitting, to a controller associated with a RIS, a second indication of a codebook for communication using the RIS, the codebook associated with a set of parameters that is based at least in part on the first indication of the first geographical region. The operations of block 910 may be performed in accordance with examples as disclosed herein. In some examples, aspects of the operations of 910 may be performed by a codebook indication component 630 as described with reference to FIG. 6.

At 915, the method may include performing, using the RIS in accordance with the codebook, a beam sweeping operation in the first geographical region. The operations of block 915 may be performed in accordance with examples as disclosed herein. In some examples, aspects of the operations of 915 may be performed by a beam sweeping component 635 as described with reference to FIG. 6.

At 920, the method may include transmitting, to the controller after performing the beam sweeping operation, a third indication of a second codebook for the communication using the RIS based at least in part on a change of the second UE density to be greater than the first UE density, the second codebook associated with a second set of parameters that is based on the second geographical region. The operations of block 920 may be performed in accordance with examples as disclosed herein. In some examples, aspects of the operations of 920 may be performed by a codebook indication component 630 as described with reference to FIG. 6.

At 925, the method may include performing, using the RIS in accordance with the second codebook, a second beam sweeping operation in the second geographical region. The operations of block 925 may be performed in accordance with examples as disclosed herein. In some examples, aspects of the operations of 925 may be performed by a beam sweeping component 635 as described with reference to FIG. 6.

FIG. 10 shows a flowchart illustrating a method 1000 that supports UE density-based codebook adjustment for RIS-assisted communications in accordance with aspects of the present disclosure. The operations of the method 1000 may be implemented by a network entity or its components as described herein. For example, the operations of the method 1000 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1005, the method may include receiving a first indication of a first geographical region associated with a first UE density that is greater than a second UE density associated with a second geographical region. The operations of block 1005 may be performed in accordance with examples as disclosed herein. In some examples, aspects of the operations of 1005 may be performed by a region indication component 625 as described with reference to FIG. 6.

At 1010, the method may include transmitting, to a controller associated with a RIS, a second indication of a codebook for communication using the RIS, the codebook associated with a set of parameters that is based at least in part on the first indication of the first geographical region. The operations of block 1010 may be performed in accordance with examples as disclosed herein. In some examples, aspects of the operations of 1010 may be performed by a codebook indication component 630 as described with reference to FIG. 6.

At 1015, the method may include performing, using the RIS in accordance with the codebook, a beam sweeping operation in the first geographical region. The operations of block 1015 may be performed in accordance with examples as disclosed herein. In some examples, aspects of the operations of 1015 may be performed by a beam sweeping component 635 as described with reference to FIG. 6.

At 1020, the method may include determining that the second UE density changed to be greater than the first UE density in accordance with a pattern of UE densities in respective geographical regions over time. The operations of block 1020 may be performed in accordance with examples as disclosed herein. In some examples, aspects of the operations of 1020 may be performed by a density determination component 640 as described with reference to FIG. 6.

At 1025, the method may include transmitting, to the controller after performing the beam sweeping operation, a third indication of a second codebook for the communication using the RIS based at least in part on the change of the second UE density to be greater than the first UE density, the second codebook associated with a second set of parameters that is based at least in part on the second geographical region, wherein the third indication is transmitted based at least in part on the determining. The operations of block 1025 may be performed in accordance with examples as disclosed herein. In some examples, aspects of the operations of 1025 may be performed by a codebook indication component 630 as described with reference to FIG. 6.

At 1030, the method may include performing, using the RIS in accordance with the second codebook, a second beam sweeping operation in the second geographical region. The operations of block 1030 may be performed in accordance with examples as disclosed herein. In some examples, aspects of the operations of 1030 may be performed by a beam sweeping component 635 as described with reference to FIG. 6.

FIG. 11 shows a flowchart illustrating a method 1100 that supports UE density-based codebook adjustment for RIS-assisted communications in accordance with aspects of the present disclosure. The operations of the method 1100 may be implemented by a network entity or its components as described herein. For example, the operations of the method 1100 may be performed by a network entity as described with reference to FIGS. 1 through 7. In some examples, a network entity may execute a set of instructions to control the functional elements of the network entity to perform the described functions. Additionally, or alternatively, the network entity may perform aspects of the described functions using special-purpose hardware.

At 1105, the method may include receiving a first indication of a first geographical region associated with a first UE density that is greater than a second UE density associated with a second geographical region. The operations of block 1105 may be performed in accordance with examples as disclosed herein. In some examples, aspects of the operations of 1105 may be performed by a region indication component 625 as described with reference to FIG. 6.

At 1110, the method may include transmitting, to a controller associated with a RIS, a second indication of a codebook for communication using the RIS, the codebook associated with a set of parameters that is based at least in part on the first indication of the first geographical region. The operations of block 1110 may be performed in accordance with examples as disclosed herein. In some examples, aspects of the operations of 1110 may be performed by a codebook indication component 630 as described with reference to FIG. 6.

At 1115, the method may include performing, using the RIS in accordance with the codebook, a beam sweeping operation in the first geographical region. The operations of block 1115 may be performed in accordance with examples as disclosed herein. In some examples, aspects of the operations of 1115 may be performed by a beam sweeping component 635 as described with reference to FIG. 6.

At 1120, the method may include receiving, before transmitting a third indication, a fourth indication of the second geographical region based at least in part on a change of the second UE density to be greater than the first UE density. The operations of block 1120 may be performed in accordance with examples as disclosed herein. In some examples, aspects of the operations of 1120 may be performed by a region indication component 625 as described with reference to FIG. 6.

At 1125, the method may include transmitting, to the controller after performing the beam sweeping operation, the third indication of a second codebook for the communication using the RIS based at least in part on the change of the second UE density to be greater than the first UE density, the second codebook associated with a second set of parameters that is based at least in part on the second geographical region, wherein the third indication is transmitted based on the fourth indication. The operations of block 1125 may be performed in accordance with examples as disclosed herein. In some examples, aspects of the operations of 1125 may be performed by a codebook indication component 630 as described with reference to FIG. 6.

At 1130, the method may include performing, using the RIS in accordance with the second codebook, a second beam sweeping operation in the second geographical region. The operations of block 1130 may be performed in accordance with examples as disclosed herein. In some examples, aspects of the operations of 1130 may be performed by a beam sweeping component 635 as described with reference to FIG. 6.

The following provides an overview of aspects of the present disclosure:

Aspect 1: A method for wireless communications at a network entity, comprising: receiving a first indication of a first geographical region associated with a first UE density that is greater than a second UE density associated with a second geographical region: transmitting, to a controller associated with a RIS, a second indication of a codebook for communication using the RIS, the codebook associated with a set of parameters that is based at least in part on the first indication of the first geographical region; and performing, using the RIS in accordance with the codebook, a beam sweeping operation in the first geographical region.

Aspect 2: The method of aspect 1, further comprising: transmitting, to the controller after performing the beam sweeping operation, a third indication of a second codebook for the communication using the RIS based at least in part on a change of the second UE density to be greater than the first UE density, the second codebook associated with a second set of parameters that is based at least in part on the second geographical region; and performing, using the RIS in accordance with the second codebook, a second beam sweeping operation in the second geographical region.

Aspect 3: The method of aspect 2, further comprising: determining that the second UE density changed to be greater than the first UE density in accordance with a pattern of UE densities in respective geographical regions over time, wherein the third indication is transmitted based at least in part on the determining.

Aspect 4: The method of aspect 2, further comprising: receiving, before transmitting the third indication, a fourth indication of the second geographical region based at least in part on the change of the second UE density to be greater than the first UE density, wherein the third indication is transmitted based at least in part on the fourth indication.

Aspect 5: The method of aspect 4, wherein the change of the second UE density satisfies a threshold change from a pattern of UE densities in the second geographical region over time, and the fourth indication is received based at least in part on the change of the second UE density satisfying the threshold change.

Aspect 6: The method of any of aspects 2 through 5, wherein the set of parameters comprises a first quantity of codewords included in the codebook and the second set of parameters comprises a second quantity of codewords included in the second codebook, and the second quantity of codewords is different than the first quantity of codewords based at least in part on the first geographical region being a first distance from the RIS that is different than a second distance of the second geographical region from the RIS.

Aspect 7: The method of any of aspects 2 through 6, wherein the set of parameters comprises at least one of a first FOV associated with the first geographical region, one or more first focal distances associated with the first geographical region, and a first quantity of codewords included in the codebook, and the second set of parameters comprises at least one of a second FOV associated with the second geographical region, one or more second focal distances associated with the second geographical region, and a second quantity of codewords included in the second codebook.

Aspect 8: The method of aspect 7, wherein the first quantity of codewords is different than the second quantity of codewords based at least in part on the first FOV being different than the second FOV.

Aspect 9: The method of any of aspects 7, wherein the first FOV is the same as the second FOV and the one or more first focal distances are different than the one or more second focal distances.

Aspect 10: The method of any of aspects 1 through 9, wherein the set of parameters comprises at least one of a FOV associated with the first geographical region, one or more focal distances from the RIS, and a quantity of codewords included in the codebook.

Aspect 11: The method of any of aspects 1 through 10, wherein receiving the first indication comprises: receiving, via one or more secure control messages, first positioning information associated with UEs located in the first geographical region over one or more durations and second positioning information associated with UEs located in the second geographical region over the one or more durations, wherein the first UE density is determined to be greater than the second UE density based at least in part on the first positioning information and the second positioning information.

Aspect 12: The method of any of aspects 1 through 11, wherein the first indication indicates that the network entity is to determine the set of parameters associated with the codebook to prioritize communications within the first geographical region over the second geographical region or a combination of the first geographical region and the second geographical region.

Aspect 13: The method of any of aspects 1 through 12, further comprising: transmitting, to the controller after performing the beam sweeping operation, a third indication of a second codebook for the communication using the RIS based at least in part on a change of the first UE density, a change of the second UE density, or both, the second codebook associated with a second set of parameters that is based at least in part on a third geographical region comprising the first geographical region and the second geographical region; and performing, using the RIS in accordance with the second codebook, a second beam sweeping operation in the third geographical region.

Aspect 14: The method of aspect 13, wherein the set of parameters comprises a first quantity of codewords included in the codebook and the second set of parameters comprises a second quantity of codewords included in the second codebook, and the second quantity of codewords is greater than the first quantity of codewords based at least in part on the third geographical region being larger than the first geographical region.

Aspect 15: A network entity for wireless communications, comprising one or more memories storing processor-executable code, and one or more processors coupled with the one or more memories and individually or collectively operable to execute the code to cause the network entity to perform a method of any of aspects 1 through 14.

Aspect 16: A network entity for wireless communications, comprising at least one means for performing a method of any of aspects 1 through 14.

Aspect 17: A non-transitory computer-readable medium storing code for wireless communications, the code comprising instructions executable by one or more processors to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity for wireless communication, comprising:
   one or more memories storing processor-executable code; and
   one or more processors coupled with the one or more memories and individually or collectively operable to execute the code to cause the network entity to:

receive a first indication of a first geographical region associated with a first UE density that is greater than a second UE density associated with a second geographical region;

transmit, to a controller associated with a reconfigurable intelligent surface, a second indication of a codebook for communication using the reconfigurable intelligent surface, the codebook associated with a set of parameters that is based at least in part on the first indication of the first geographical region, wherein the set of parameters comprises a field of view associated with the first geographical region; and perform, using the reconfigurable intelligent surface in accordance with the codebook, a beam sweeping operation in the first geographical region.

2. The network entity of claim 1, wherein the one or more processors are individually or collectively further operable to execute the code to cause the network entity to:

transmit, to the controller after performing the beam sweeping operation, a third indication of a second codebook for the communication using the reconfigurable intelligent surface based at least in part on a change of the second UE density to be greater than the first UE density, the second codebook associated with a second set of parameters that is based at least in part on the second geographical region; and perform, using the reconfigurable intelligent surface in accordance with the second codebook, a second beam sweeping operation in the second geographical region.

3. The network entity of claim 2, wherein the one or more processors are individually or collectively further operable to execute the code to cause the network entity to:

determine that the second UE density changed to be greater than the first UE density in accordance with a pattern of UE densities in respective geographical regions over time, wherein the third indication is transmitted based at least in part on the determining.

4. The network entity of claim 2, wherein the one or more processors are individually or collectively further operable to execute the code to cause the network entity to:

receive, before transmitting the third indication, a fourth indication of the second geographical region based at least in part on the change of the second UE density to be greater than the first UE density, wherein the third indication is transmitted based at least in part on the fourth indication.

5. The network entity of claim 4, wherein:

the change of the second UE density satisfies a threshold change from a pattern of UE densities in the second geographical region over time, and the fourth indication is received based at least in part on the change of the second UE density satisfying the threshold change.

6. The network entity of claim 2, wherein:

the set of parameters comprises a first quantity of codewords included in the codebook and the second set of parameters comprises a second quantity of codewords included in the second codebook, and the second quantity of codewords is different than the first quantity of codewords based at least in part on the first geographical region being a first distance from the reconfigurable intelligent surface that is different than a second distance of the second geographical region from the reconfigurable intelligent surface.

7. The network entity of claim 2, wherein:

the field of view is a first field of view, and wherein the set of parameters further comprises at least one of one or more first focal distances associated with the first geographical region, and a first quantity of codewords included in the codebook, and the second set of parameters comprises at least one of a second field of view associated with the second geographical region, one or more second focal distances associated with the second geographical region, and a second quantity of codewords included in the second codebook.

8. The network entity of claim 7, wherein the first quantity of codewords is different than the second quantity of codewords based at least in part on the first field of view being different than the second field of view.

9. The network entity of claim 7, wherein the first field of view is the same as the second field of view and the one or more first focal distances are different than the one or more second focal distances.

10. The network entity of claim 1, wherein the set of parameters further comprises at least one of one or more focal distances from the reconfigurable intelligent surface, and a quantity of codewords included in the codebook.

11. The network entity of claim 1, wherein, to receive the first indication, the one or more processors are individually or collectively operable to execute the code to cause the network entity to:

receive, via one or more secure control messages, first positioning information associated with user equipments (UEs) located in the first geographical region over one or more durations and second positioning information associated with UEs located in the second geographical region over the one or more durations, wherein the first UE density is determined to be greater than the second UE density based at least in part on the first positioning information and the second positioning information.

12. The network entity of claim 1, wherein the first indication indicates that the network entity is to determine the set of parameters associated with the codebook to prioritize communications within the first geographical region over the second geographical region or a combination of the first geographical region and the second geographical region.

13. The network entity of claim 1, wherein the one or more processors are individually or collectively further operable to execute the code to cause the network entity to:

transmit, to the controller after performing the beam sweeping operation, a third indication of a second codebook for the communication using the reconfigurable intelligent surface based at least in part on a change of the first UE density, a change of the second UE density, or both, the second codebook associated with a second set of parameters that is based at least in part on a third geographical region comprising the first geographical region and the second geographical region; and perform, using the reconfigurable intelligent surface in accordance with the second codebook, a second beam sweeping operation in the third geographical region.

14. The network entity of claim 13, wherein:

the set of parameters comprises a first quantity of codewords included in the codebook and the second set of parameters comprises a second quantity of codewords included in the second codebook, and the second quantity of codewords is greater than the first quantity of codewords based at least in part on the third geographical region being larger than the first geographical region.

15. A method for wireless communications by a network entity, comprising:

receiving a first indication of a first geographical region associated with a first UE density that is greater than a second UE density associated with a second geographical region;

transmitting, to a controller associated with a reconfigurable intelligent surface, a second indication of a codebook for communication using the reconfigurable intelligent surface, the codebook associated with a set of parameters that is based at least in part on the first indication of the first geographical region, wherein the set of parameters comprises a field of view associated with the first geographical region; and performing, using the reconfigurable intelligent surface in accordance with the codebook, a beam sweeping operation in the first geographical region.

16. The method of claim 15, further comprising:

transmitting, to the controller after performing the beam sweeping operation, a third indication of a second codebook for the communication using the reconfigurable intelligent surface based at least in part on a change of the second UE density to be greater than the first UE density, the second codebook associated with a second set of parameters that is based at least in part on the second geographical region; and performing, using the reconfigurable intelligent surface in accordance with the second codebook, a second beam sweeping operation in the second geographical region.

17. The method of claim 16, further comprising:

determining that the second UE density changed to be greater than the first UE density in accordance with a pattern of UE densities in respective geographical regions over time, wherein the third indication is transmitted based at least in part on the determining.

18. The method of claim 16, further comprising:

receiving, before transmitting the third indication, a fourth indication of the second geographical region based at least in part on the change of the second UE density to be greater than the first UE density, wherein the third indication is transmitted based at least in part on the fourth indication.

19. The method of claim 18, wherein:

the change of the second UE density satisfies a threshold change from a pattern of UE densities in the second geographical region over time, and the fourth indication is received based at least in part on the change of the second UE density satisfying the threshold change.

20. The method of claim 16, wherein:

the set of parameters comprises a first quantity of codewords included in the codebook and the second set of parameters comprises a second quantity of codewords included in the second codebook, and the second quantity of codewords is different than the first quantity of codewords based at least in part on the first geographical region being a first distance from the reconfigurable intelligent surface that is different than a second distance of the second geographical region from the reconfigurable intelligent surface.

21. The method of claim 16, wherein:

the field of view is a first field of view, and wherein the set of parameters further comprises at least one of one or more first focal distances associated with the first geographical region, and a first quantity of codewords included in the codebook, and the second set of parameters comprises at least one of a second field of view associated with the second geographical region, one or more second focal distances associated with the second geographical region, and a second quantity of codewords included in the second codebook.

22. The method of claim 21, wherein the first quantity of codewords is different than the second quantity of codewords based at least in part on the first field of view being different than the second field of view.

23. The method of claim 21, wherein the first field of view is the same as the second field of view and the one or more first focal distances are different than the one or more second focal distances.

24. The method of claim 15, wherein the set of parameters further comprises at least one of one or more focal distances from the reconfigurable intelligent surface, and a quantity of codewords included in the codebook.

25. The method of claim 15, wherein receiving the first indication comprises:

receiving, via one or more secure control messages, first positioning information associated with user equipments (UEs) located in the first geographical region over one or more durations and second positioning information associated with UEs located in the second geographical region over the one or more durations, wherein the first UE density is determined to be greater than the second UE density based at least in part on the first positioning information and the second positioning information.

26. The method of claim 15, wherein the first indication indicates that the network entity is to determine the set of parameters associated with the codebook to prioritize communications within the first geographical region over the second geographical region or a combination of the first geographical region and the second geographical region.

27. The method of claim 15, further comprising:

transmitting, to the controller after performing the beam sweeping operation, a third indication of a second codebook for the communication using the reconfigurable intelligent surface based at least in part on a change of the first UE density, a change of the second UE density, or both, the second codebook associated with a second set of parameters that is based at least in part on a third geographical region comprising the first geographical region and the second geographical region; and performing, using the reconfigurable intelligent surface in accordance with the second codebook, a second beam sweeping operation in the third geographical region.

28. The method of claim 27, wherein:

the set of parameters comprises a first quantity of codewords included in the codebook and the second set of parameters comprises a second quantity of codewords included in the second codebook, and the second quantity of codewords is greater than the first quantity of codewords based at least in part on the third geographical region being larger than the first geographical region.

29. A network entity for wireless communication, comprising:

means for receiving a first indication of a first geographical region associated with a first UE density that is greater than a second UE density associated with a second geographical region;

means for transmitting, to a controller associated with a reconfigurable intelligent surface, a second indication of a codebook for communication using the reconfigurable intelligent surface, the codebook associated with a set of parameters that is based at least in part on the first indication of the first geographical region, wherein the set of parameters comprises a field of view associated with the first geographical region; and means for performing, using the reconfigurable intelligent surface in accordance with the codebook, a beam sweeping operation in the first geographical region.

30. A non-transitory computer-readable medium storing code for wireless communications by a network entity, the code comprising instructions executable by one or more processors to:

receive a first indication of a first geographical region associated with a first UE density that is greater than a second UE density associated with a second geographical region;

transmit, to a controller associated with a reconfigurable intelligent surface, a second indication of a codebook for communication using the reconfigurable intelligent surface, the codebook associated with a set of parameters that is based at least in part on the first indication of the first geographical region, wherein the set of parameters comprises a field of view associated with the first geographical region; and perform, using the reconfigurable intelligent surface in accordance with the codebook, a beam sweeping operation in the first geographical region.

* * * * *